(12) United States Patent
Watanabe et al.

(10) Patent No.: US 10,496,930 B2
(45) Date of Patent: Dec. 3, 2019

(54) APPARATUS AND METHOD TO DETERMINE A DISTRIBUTION DESTINATION OF A MESSAGE BASED ON A PROBABILITY OF CO-OCCURRENCE OF WORDS INCLUDED IN DISTRIBUTED MESSAGES

(71) Applicant: FUJITSU LIMITED, Kawasaki-shi, Kanagawa (JP)

(72) Inventors: Yukihiro Watanabe, Kawasaki (JP); Ken Yokoyama, Kawasaki (JP); Masahiro Asaoka, Kawasaki (JP); Hiroshi Otsuka, Kawasaki (JP); Reiko Kondo, Yamato (JP)

(73) Assignee: FUJITSU LIMITED, Kawasaki (JP)

( * ) Notice: Subject to any disclaimer, the term of this patent is extended or adjusted under 35 U.S.C. 154(b) by 185 days.

(21) Appl. No.: 15/700,496

(22) Filed: Sep. 11, 2017

(65) Prior Publication Data
US 2018/0082205 A1    Mar. 22, 2018

(30) Foreign Application Priority Data
Sep. 20, 2016    (JP) .................................. 2016-182532

(51) Int. Cl.
*G06F 17/27*    (2006.01)
*G06N 7/00*    (2006.01)
*G06F 17/21*    (2006.01)

(52) U.S. Cl.
CPC ............. *G06N 7/005* (2013.01); *G06F 17/21* (2013.01); *G06F 17/277* (2013.01); *G06F 17/2765* (2013.01)

(58) Field of Classification Search
CPC ...... G06F 17/27; G06F 17/20; G06F 17/2705; G06F 17/271; G06F 17/2715;
(Continued)

(56) References Cited

U.S. PATENT DOCUMENTS 5,860,063 A * 1/1999 Gorin .................. G10L 15/1815
704/245
7,206,389 B1 * 4/2007 Dumoulin ........... G10L 15/1822
379/218.01
(Continued)

FOREIGN PATENT DOCUMENTS

JP    2013-69140    4/2013
JP    2015-153250    8/2015

*Primary Examiner* — Lamont M Spooner
(74) *Attorney, Agent, or Firm* — Xsensus LLP

(57) ABSTRACT

With reference to information storing a co-occurrence probability of each of plural words in association with each of distribution-destinations, the apparatus extracts, from a message to be distributed, an unknown-word that is not included in the plural words, where the co-occurrence probability indicates a probability that each word is included in a message to be distributed to each distribution-destination. When the unknown-word is present in the message at a predetermined ratio or greater, the apparatus extracts first-words included in all of a first-group of messages each including the unknown-word, calculates the co-occurrence probability of the unknown-word for each distribution-destination, based on the information regarding the distribution-destinations to which a message including the first-words and a second-word, which is included in all of a second-group of messages each including the first-words and not including the unknown-word, is to be distributed, and registers the calculated co-occurrence probability in the information.

7 Claims, 37 Drawing Sheets

(58) Field of Classification Search
CPC .. G06F 17/272; G06F 17/2725; G06F 17/273; G06F 17/2735; G06F 17/274; G06F 17/2745; G06F 17/275; G06F 17/2755; G06F 17/276; G06F 17/2765; G06F 17/277; G06F 17/2775; G06F 17/278; G06F 17/2785; G06F 17/2795
USPC .................................................. 704/1, 9, 10
See application file for complete search history.

(56) References Cited

U.S. PATENT DOCUMENTS

| | | | | |
|---|---|---|---|---|
| 7,231,379 | B2* | 6/2007 | Parikh | G06F 16/322 |
| 8,606,575 | B1* | 12/2013 | Witt-ehsani | G10L 15/063 |
| | | | | 704/1 |
| 8,700,404 | B1* | 4/2014 | Chotimongkol | G10L 15/1815 |
| | | | | 704/257 |
| 2005/0203900 | A1* | 9/2005 | Nakamura | G06F 16/334 |
| 2005/0209844 | A1* | 9/2005 | Wu | G06F 17/2223 |
| | | | | 704/2 |
| 2011/0029303 | A1* | 2/2011 | Mizuguchi | G06F 17/2735 |
| | | | | 704/9 |
| 2011/0145214 | A1* | 6/2011 | Zhang | G06F 16/3329 |
| | | | | 707/706 |
| 2013/0282727 | A1* | 10/2013 | Muraoka | G06F 17/2785 |
| | | | | 707/740 |
| 2016/0246851 | A1* | 8/2016 | Abe | G06F 16/3334 |
| 2017/0277672 | A1* | 9/2017 | Cho | G06F 3/04845 |
| 2017/0322930 | A1* | 11/2017 | Drew | G06F 16/338 |

* cited by examiner

FIG. 7

TRAINING DATA MESSAGE LOG ~411

| LOG ID | CONTENT OF MESSAGE |
|---|---|
| 1320606 | WARNING: AUTHENTICATION ERROR HAS OCCURRED IN JOB MANAGEMENT SERVER App002. [OPERATOR: TAKAHASHI; JOB ID: JOB063; JOB NAME: "SERVER OPERATION CHECK"] ~701-1 |
| 1322561 | IN MIDDLE OF WAITING FOR CANCEL OF WRITE COMMAND, FLUSH AND HOLD OF WRITE OPERATION TO Volume[29eaaa36-1e1a-11e2-92f3-806e6f6e6963] HAS TIMED OUT. ~701-2 |
| .. | .. |

| MESSAGE TO BE DISTRIBUTED ～mt |
|---|

| CONTENT OF MESSAGE | |
|---|---|
| [sys] [ERROR] [volsnap] [8] IN MIDDLE OF WAITING FOR CANCEL OF WRITE COMMAND, FLUSH AND HOLD OF WRITE OPERATION TO VOLUME C: HAS TIMED OUT | ～901-1 |
| DB: WARNING: UNABLE TO COUPLE TO AUDIT SYSTEM | ～901-2 |
| .. | |

FIG. 11

CONTEXT INFORMATION ~421

| UNKNOWN WORD | CONTEXT | CONTEXT SCORE | |
|---|---|---|---|
| [MONITORING] | [ping, error] | 0.5 | ~1101-1 |
| [login] | [web, server] | 0.5 | ~1101-2 |
| [gyoumu] | [web, server, fault] | 0.75 | ~1101-3 |
| | | | |

FIG. 12

SIMILAR USAGE WORD INFORMATION ~422

| UNKNOWN WORD | CONTEXT WORD | SIMILAR USAGE WORD | |
|---|---|---|---|
| [MONITORING] | [ping, error] | [available] | ~1201-1 |
| [login] | [web, server] | [LOGON] | ~1201-2 |
| [MONITORING] | [ping, error, REPLY] | [response] | ~1201-3 |
| [gyoumu] | [web, server, fault] | [JOB] | ~1201-4 |
| | | | |

FIG. 29

CO-OCCURRENCE PROBABILITY TABLE ~2353
(AFTER PROCESSING FOR n = 2)

| CO-OCCURRENCE PHENOMENON | PRIOR PHENOMENON | POSTERIOR PHENOMENON | PRIOR NUMBER | NUMBER OF CO-OCCURRENCES | CO-OCCURRENCE PROBABILITY | |
|---|---|---|---|---|---|---|
| [ping, error] | [ping] | [error] | 102 | 88 | 0.86 | ~2901-1 |
| [web, server] | [server] | [web] | 303 | 202 | 0.67 | ~2901-2 |
| [ping, error, ERROR] | [ping, error] | [ERROR] | 88 | 28 | 0.32 | ~2901-3 |
| [ping, error, REPLY] | [ping, error] | [REPLY] | 88 | 65 | 0.74 | ~2901-4 |
| [web, server, fault] | [web, server] | [fault] | 202 | 112 | 0.55 | ~2901-5 |

APPARATUS AND METHOD TO DETERMINE A DISTRIBUTION DESTINATION OF A MESSAGE BASED ON A PROBABILITY OF CO-OCCURRENCE OF WORDS INCLUDED IN DISTRIBUTED MESSAGES

CROSS-REFERENCE TO RELATED APPLICATION

This application is based upon and claims the benefit of priority of the prior Japanese Patent Application No. 2016-182532, filed on Sep. 20, 2016, the entire contents of which are incorporated herein by reference.

FIELD

The embodiment discussed herein is related to apparatus and method to determine a distribution destination of a message based on a probability of co-occurrence of words included in distributed messages.

BACKGROUND

In some situations, various messages are each distributed to an appropriate distribution destination out of multiple distribution destinations according to the content of the message. For instance, a known technique calculates, for each distribution destination of multiple distribution destinations, a probability that a message to be distributed is distributed to each distribution destination, based on co-occurrence probability information that stores a co-occurrence probability of each word of multiple words in association with each distribution destination of the multiple distribution destinations, and determines that a distribution destination with the highest calculated probability is an appropriate distribution destination. This technique is called Bayesian classification.

In related art, a server at a transfer destination of a message, which has been inputted using the Bayesian classification, is determined based on given learning data, for instance. Also, a known technique generates, by using the Bayesian estimation, a prior distribution of the number of occurrences of each word included in a second vocabulary set, based on first word distribution that is a multinomial distribution of the number of occurrences of each word included in a first vocabulary set.

Related techniques are disclosed in, for example, Japanese Laid-open Patent Publication Nos. 2015-153250 and 2013-69140.

SUMMARY

According to an aspect of the invention, with reference to co-occurrence probability information that stores a first co-occurrence probability of each of a plurality of words in association with each of a plurality of distribution destinations, an apparatus extracts, from words included in a message to be distributed, an unknown word that is not included in the plurality of words, where the first co-occurrence probability indicates a probability that each word is included in a message distributed to the each distribution destination associated therewith. When the unknown word is present in words included in the message to be distributed at a predetermined ratio or greater, the apparatus extracts first words which are included in all of a first group of messages each including the unknown word. Then the apparatus calculates the first co-occurrence probability of the unknown word for each distribution destination, based on the co-occurrence probability information regarding the plurality of distribution destinations to which a message including a second word, which is included in all of a second group of messages each including the first words and not including the unknown word, is to be distributed, and registers the calculated first co-occurrence probability of the unknown word for each distribution destination, in the co-occurrence probability information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a diagram illustrating an example of stored data in a training data message log, according to an embodiment;

FIG. 11 is a diagram illustrating an example of stored data in context information, according to an embodiment;

FIG. 12 is a diagram illustrating an example of stored data in similar usage word information, according to an embodiment;

FIG. 29 is a diagram illustrating an example of stored data in a co-occurrence probability table at the time of co-occurrence probability calculation processing, according to an embodiment;

DESCRIPTION OF EMBODIMENT

In related art, it may be not possible to identify a correct distribution destination of a message to be distributed. For example, when a certain number or more of the words included in a message to be distributed are unknown and not registered in the co-occurrence probability information, the Bayesian classification outputs unknown for a distribution destination, and it is not possible to identify a correct distribution destination of the message to be distributed.

It is preferable to register an unknown word in co-occurrence probability information having a co-occurrence probability of each word corresponding to each distribution destination.

Hereinafter an embodiment of a message distribution program, a message distribution device, and a message distribution method in the disclosure will be described in detail with reference to the drawings.

Figure 1:
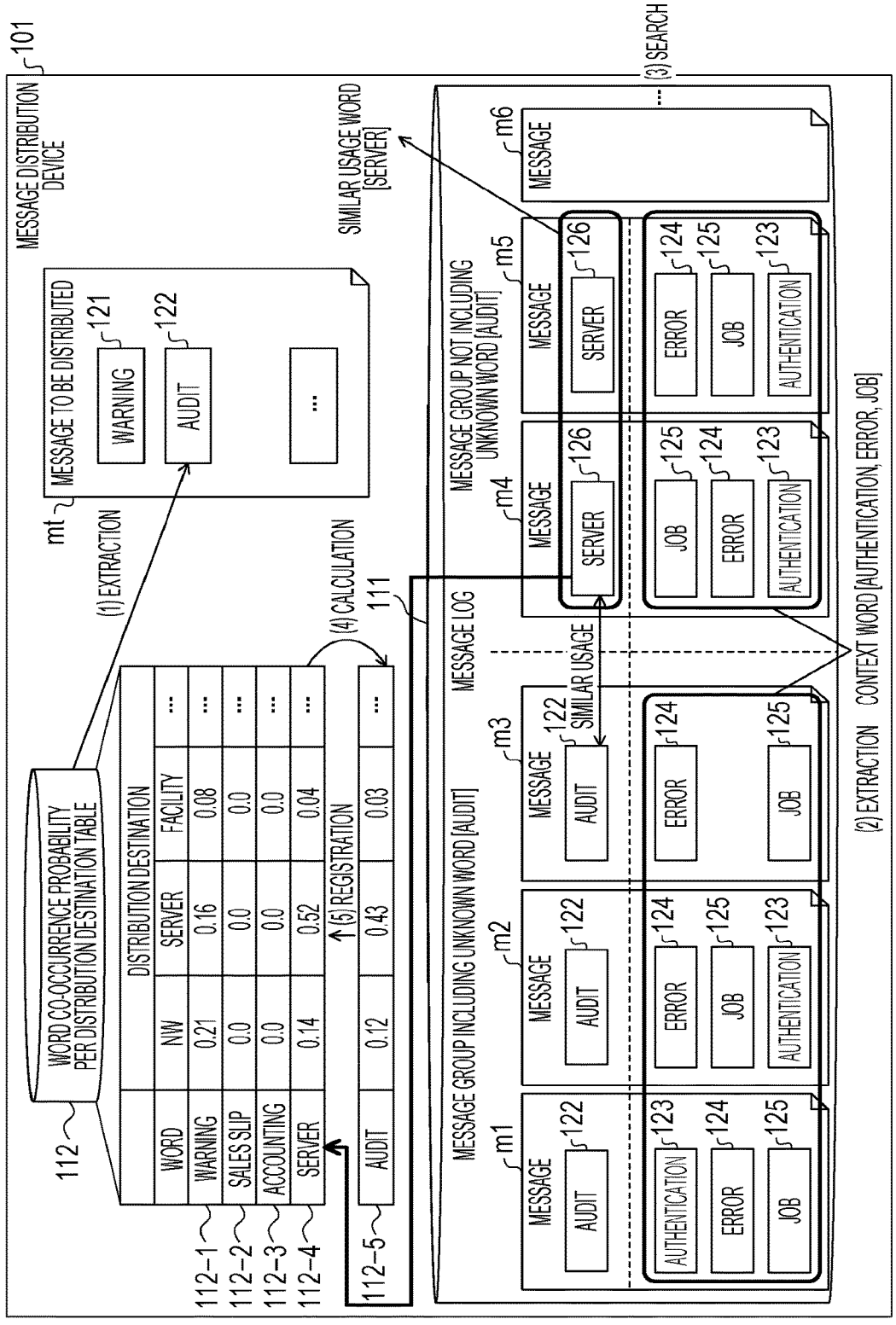
FIG. 1 is a diagram illustrating an example of operation of a message distribution device, according to an embodiment.

FIG. 1 is an explanatory diagram illustrating an example operation of a message distribution device 101 according to this embodiment. The message distribution device 101 is a computer that distributes a message. The message distribution device 101 is, for instance, a server. The message refers to data including a character string. The character string may be written in any language, and is, for instance, a Japanese character string or an English character string.

Techniques to which the message distribution device 101 is applied include, for instance, message monitoring in which each of a large amount of messages is distributed, according the content of the message, to an appropriate department in charge, out of multiple departments in charge which are multiple distribution destinations. For example, the message distribution device 101 is applied to monitoring of a client system in a data center (DC). For instance, when a message indicates a problematic factor of the side that provides a client system, such as a hardware failure, the message distribution device 101 determines that the distribution destination is a maintenance staff in charge of infrastructure. Also, when a message indicates a problematic factor of the side that uses a client system, such as abnormal termination of application software, the message distribution device 101 determines that the distribution destination is a maintenance staff in charge of clients. Hereinafter, application software is simply referred to as "application". A specific example of application of the message distribution device 101 will be described in FIG. 2.

Here, as a method of distributing messages, a message monitoring person in charge may distribute the contents of messages. However, when a large amount of messages are sent as notifications, there is a limit in the amount of messages distributed by the message monitoring person in charge.

In addition, techniques to determine a distribution destination of each message includes the technique called Bayesian classification that for each distribution destination, calculates a probability that a message to be distributed is distributed to the distribution destination, from co-occurrence probability information, and determines that a distribution destination with the highest probability obtained is an appropriate distribution destination. In the following description, the co-occurrence probability information is referred to as the "word co-occurrence probability per distribution destination table". Here, the word co-occurrence probability per distribution destination table stores a co-occurrence probability of each of multiple words in association with each of multiple distribution destinations. Here, the words each may belong to any word class, and may include not only nouns but also verbs and adjectives. Also, articles, such as "a", "the" may be excluded from the multiple words registered in the word co-occurrence probability per distribution destination table.

The co-occurrence probability of each word indicates a probability that each word is included in a message when the message is distributed to each distribution destination. For instance, when the co-occurrence probability of the word "WARNING" for the distribution destination "NW" is 0.21, this indicates that each message having the distribution destination of "NW" includes the word "WARNING" with a probability of 21%.

In the Bayesian classification, let C be a distribution destination and $w_1, w_2, \ldots, w_n$ be the words included in a message to be distributed, then the probability $p(C|w_1, w_2, \ldots, w_n)$ that C is the distribution destination of the message is calculated by the following Expression (1).

$$p(C|w_1, w_2, \ldots, w_n) = \alpha * p(C) \prod_{i=1}^{n} p(w_i|C) \quad (1)$$

Here, α is a constant. Also, p(C) indicates the frequency of the message to the distribution destination C. Also, $p(w_i|C)$ is the co-occurrence probability of the word "$w_i$" for the distribution destination C.

(1) As illustrated in the above Expression, in order to use the Bayesian classification, an operator or the like has to prepare the word co-occurrence probability per distribution destination table and the frequency of a given message to the distribution destination C. The data prepared in advance is called "training data". Also, determining a co-occurrence probability of a word for a distribution destination, based on the training data, is called "Bayesian learning".

However, in an operational environment, it may be difficult to perform Bayesian learning. Specifically, training data for performing Bayesian learning is prepared by an operator, and work for the preparation takes time and effort, and thus an operator may be unable to prepare sufficient training data. In this case, due to insufficiency of the training data, the co-occurrence probability of each word for each distribution destination is not sufficiently prepared, in other words, the words registered in the word co-occurrence probability per distribution destination table are not enriched.

In such a state, an unknown word, which is not registered in the word co-occurrence probability per distribution destination table, is likely to appear in a message to be distributed. Since an unknown word is not used for determination of a distribution destination, a message including unknown words at a certain ratio or greater may not be distributed by the Bayes classification.

Thus, in this embodiment, the following method will be described: context words, which are included, together with the unknown word, in common in each of a first group of messages each including the unknown word, is extracted; and a distribution destination of the unknown word is registered based on the distribution destination of a similar usage word, which is included, together with the context words, in common in each of a second group of messages each not including the unknown word.

The operation example of the message distribution device 101 will be described using FIG. 1. In FIG. 1, the message distribution device 101 determines a distribution destination of a message mt to be distributed. The message mt to be distributed includes [WARNING] and [AUDIT] as words 121 and 122. The message distribution device 101 obtains the message mt to be distributed by receiving it from, for instance, DC, but the embodiment is not limited to this. For instance, the message distribution device 101 may obtain a message to be distributed, which is generated by an application operated by the message distribution device 101.

Also, the message distribution device 101 is accessible to a message log 111 and a word co-occurrence probability per distribution destination table 112. The message log 111 is a log that has accumulated the messages acquired before the message mt to be distributed is received.

The message log 111 illustrated in FIG. 1 includes messages m1 to m6. Also, the word co-occurrence probability per distribution destination table 112 illustrated in FIG. 1 includes entries 112-1 to 4. In addition, the word co-occurrence probability per distribution destination table 112 illustrated in FIG. 1 include [NW], [SERVER], [FACILITY], . . . as respective multiple distribution destinations. As the co-occurrence probabilities of respective words for [NW], [SERVER], [FACILITY], the word co-occurrence probability per distribution destination table 112 illustrated in FIG. 1 stores the respective co-occurrence probabilities of [WARNING], [SALES SLIP], [ACCOUNTING], [SERVER].

The message distribution device 101 refers to the word co-occurrence probability per distribution destination table 112, and extracts, from the words included in the message mt to be distributed, an unknown word which is not included in the multiple words registered in the word co-occurrence probability per distribution destination table 112. For instance, as illustrated in (1) of FIG. 1, the message distribution device 101 extracts the word 122, [AUDIT], as an unknown word.

Next, when unknown words are present in the words included in the message to be distributed at a predetermined ratio or greater, the message distribution device 101 extracts first words, from the message log 111, which are included in common in each of a first group of messages each including the unknown word. The first words are referred to as the "context words". The context words preferably include many words but may include one word. In FIG. 1, the messages m1 to m3 in the area on the left side divided by a vertical dashed line in the message log 111 constitute the first group of messages each including the unknown word [AUDIT]. Also, a message including the unknown word is message data other than the training data.

As a method of extracting context words, for instance, the message distribution device 101 totals the number of co-occurrences of two words within each of the first group of messages, determines a co-occurrence probability of the two words, and extracts the two words with the co-occurrence probability exceeding a predetermined threshold, as context candidates. In addition, the message distribution device 101 may add a word to the two words as the context candidates, and may extract three words having a co-occurrence probability exceeding a predetermined threshold, as the context candidates. Also, when the context words include one word, as a context candidate, the message distribution device 101 may extract one word that appears in common in each of the first group of messages with a probability exceeding a predetermined threshold.

For instance, as illustrated in (2) of FIG. 1, the message distribution device 101 extracts words 123 to 125, [AUTHENTICATION, ERROR, JOB], as the context candidates.

The message distribution device 101 then searches for a second word which is of the message log 111 and is a common word included in each of the second group of messages each not including the unknown word. Here, when a message including the second word and the context words is compared with a message including the unknown word and the context words, the context words are common words in the messages, and thus the second word and the unknown word may be considered as the words that are used in the same context. In other words, since the second word and the unknown word are used in the same context, it may be said that both have similar usage. Therefore, the second word is referred to as the "similar usage word". In FIG. 1, the area of the messages m1 to m5 is divided by a horizontal dashed line in the message log 111, which schematically illustrates that the similar usage word and the unknown word have similar usage. As an example of the relationship between an unknown word and a similar usage word, synonyms such as [LOGIN] and [LOGON] may appear.

Here, in FIG. 1, the messages m4 to m6 in the area on the right side divided by a dashed line in the message log 111 constitute the second group of messages each not including the unknown word [AUDIT]. The messages m4 and m5 include the context words [AUTHENTICATION, ERROR, JOB]. Thus, as illustrated in (3) of FIG. 1, the message distribution device 101 searches for a similar usage word that is included as a common word in the messages m4 and m5. As a result of the search, the message distribution device 101 extracts a word 126, [SERVER], as a similar usage word.

The message distribution device 101 then refers to the word co-occurrence probability per distribution destination table 112, and calculates the co-occurrence probabilities for respective distribution destinations of the unknown word, based on the co-occurrence probabilities for the respective distribution destinations of the similar usage word. For instance, as illustrated in (4) of FIG. 1, the message distribution device 101 calculates a co-occurrence probability of the unknown word [AUDIT] as the product of a co-occurrence probability at each distribution destination of the entry 112-4 and (the number of context words/the number of context words+1), that is, 0.75. The value by which the co-occurrence probability at each distribution destination is multiplied may be determined as a value that increases monotonically between 0 and 1 as the number of context words increases. Hereinafter, the value by which the co-occurrence probability at each distribution destination is multiplied is referred to as the "context score". The context score will be described in FIG. 4, FIG. 32, and FIG. 33.

The message distribution device 101 registers the calculated co-occurrence probability for each distribution destination of the unknown word, in the word co-occurrence probability per distribution destination table 112. For instance, as illustrated in (5) of FIG. 1, the message distribution device 101 registers the entry 112-5 including the respective co-occurrence probabilities of the unknown word [AUDIT], in the word co-occurrence probability per distribution destination table 112.

In this way, the message distribution device 101 has obtained the appropriate co-occurrence probabilities for the respective destinations of the unknown word, and then is able to register the unknown word [AUDIT] in the word co-occurrence probability per distribution destination table 112. The increased number of words registered in the word co-occurrence probability per distribution destination table 112 increases a possibility that the message distribution device 101 appropriately distributes the message mt to be distributed. In addition, it is possible for the message distribution device 101 to determine a distribution destination of a message with a smaller volume of training data.

Also, the method of calculating a co-occurrence probabilities of the unknown word [AUDIT] is not limited to the method illustrated in (3), (4) of FIG. 1. For instance, the message distribution device 101 may calculate a co-occurrence probability for each distribution destination of the unknown word, based on the distribution destination of each message including the similar usage word and the context words in the second group of messages. For instance, in the example of FIG. 1, the messages including the similar usage word and the context words in the second group of messages are given by the messages m4, m5, . . . . Specifically, the message distribution device 101 calculates a co-occurrence probability of the unknown word [AUDIT] for each distribution destination, as (the number of messages to each distribution destination)/(the number of messages each including the similar usage word and the context words in the second group of messages). For instance, the message distribution device 101 calculates a co-occurrence probability of the unknown word [AUDIT] for the distribution destination [NW], as (the number of messages to the distribution destination [NW])/(the number of messages each including the similar usage word and the context words in the second group of messages).

Next, a specific example of application of the message distribution device 101 will be described using FIG. 2.

Figure 2:
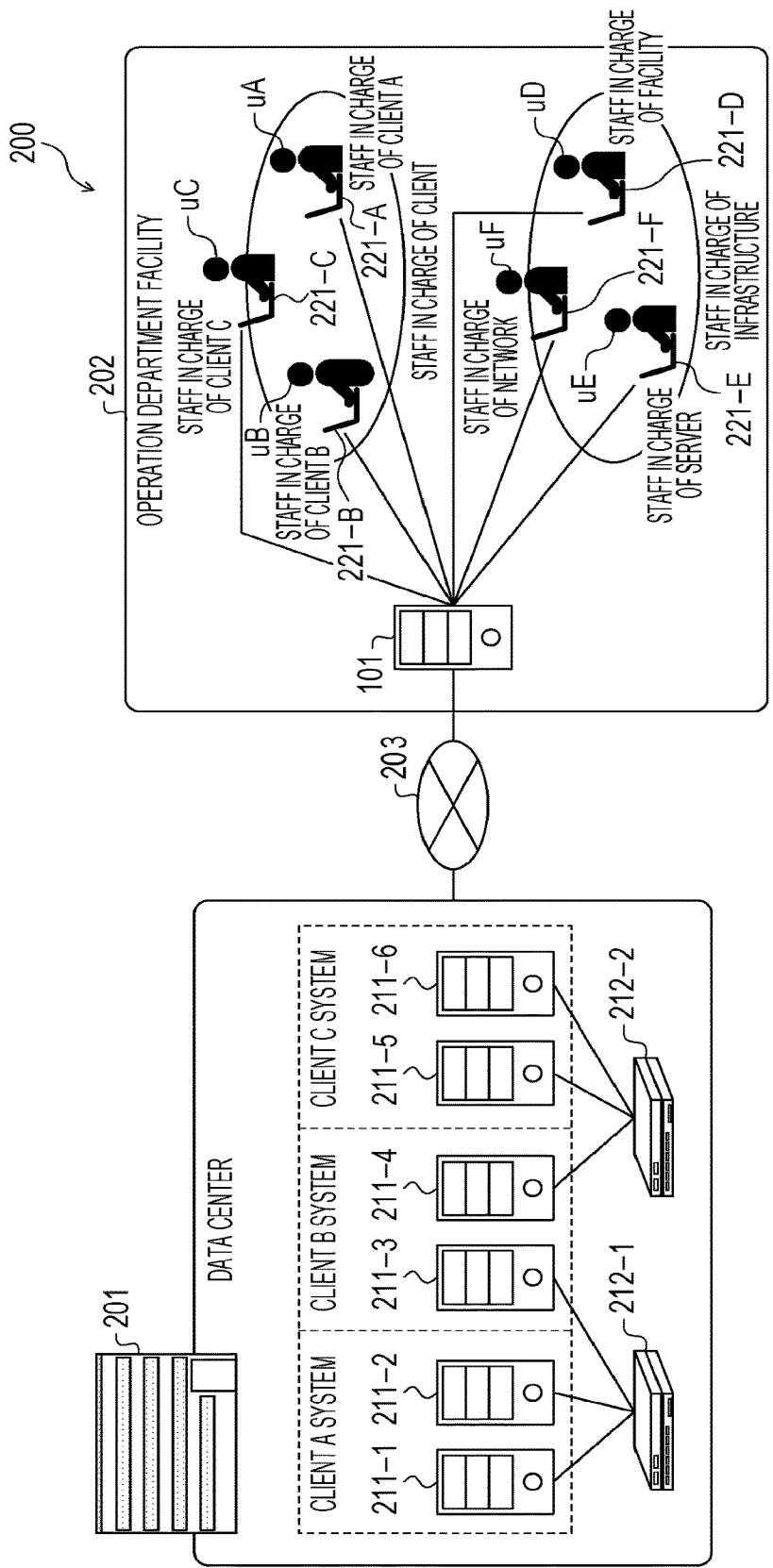
FIG. 2 is a diagram illustrating an example of a configuration of a message monitoring system, according to an embodiment.

FIG. 2 is an explanatory diagram illustrating an example configuration of a message monitoring system 200. The message monitoring system 200 illustrated in FIG. 2 is a system that monitors three client systems A to C. The message monitoring system 200 includes a DC 201 and an operation department facility 202. A computer in the DC and a computer of the operation department facility 202 are coupled to each other via a network 203, such as the Internet, a local area network (LAN), or a wide area network (WAN).

The DC 201 is a facility that installs and operates IT devices such as a server and a network device. The DC 201 illustrated in FIG. 2 includes servers 211-1 to 6, and network devices 212-1, 2. The servers 211-1, 2 operates a client A system, the servers 211-3, 4 operates a client B system, and the servers 211-5, 6 operates a client C system.

The operation department facility 202 includes the message distribution device 101 and staff-in-charge terminals 221-A to F. The message distribution device 101 transmits a message from the DC 201 to an appropriate distribution destination among the staff-in-charge terminals 221-A to F. The staff-in-charge terminals 221-A to F are computers that are used by staffs in charge uA to uF, respectively. Here, the staffs in charge uA to uC are in charge of clients. The staff in charge uA is in charge of client A, the staff in charge uB is in charge of client B, and the staff in charge uC is in charge of client C. On the other hand, the staffs in charge uD to uF are in charge of the infrastructure. The staff in charge uD is in charge of the facility, the staff in charge uE is in charge of the server, and the staff in charge uF is in charge of the network. Next, the hardware configuration of the message distribution device 101 will be described using FIG. 3.

(Example Hardware Configuration of Message Distribution Device 101)

Figure 3:
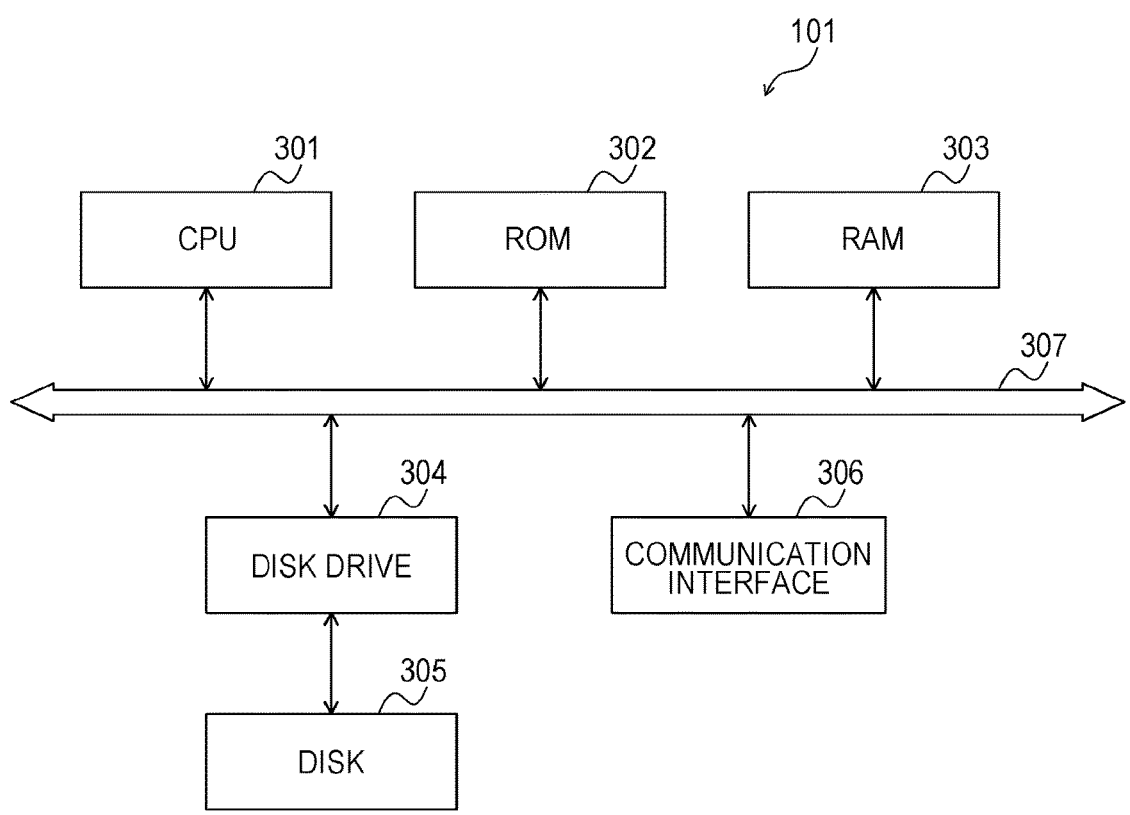
FIG. 3 is a diagram illustrating an example of a hardware configuration of a message distribution device, according to an embodiment.

FIG. 3 is an explanatory diagram illustrating an example hardware configuration of the message distribution device 101. In FIG. 3, the message distribution device 101 includes a central processing unit (CPU) 301, a read-only memory (ROM) 302, and a random access memory (RAM) 303. In addition, the message distribution device 101 includes a disk drive 304, a disk 305, and a communication interface 306. The CPU 301 to the disk drive 304, and the communication interface 306 are coupled to each other via a bus 307.

The CPU 301 is an arithmetic processing unit that manages control of the message distribution device 101 in its entirety. The ROM 302 is a non-volatile memory that stores a program such as a boot program. The RAM 303 is a volatile memory that is used as a work area of the CPU 301.

The disk drive 304 is a control device that controls the read and write of data from and to the disk 305 in accordance with the control of the CPU 301. As the disk drive 304, for instance, a magnetic disk drive, an optical disk drive, or a solid-state drive may be adopted. The disk 305 is a non-volatile memory that stores data which is written by the control of the disk drive 304. For instance, when the disk drive 304 is a magnetic disk drive, a magnetic disk may be adopted as the disk 305. Also, when the disk drive 304 is an optical disk drive, an optical disk may be adopted as the disk 305. Also, when disk drive 304 is a solid-state drive, a semiconductor memory formed of a semiconductor device, what is called a semiconductor disk may be adopted as the disk 305.

The communication interface 306 is a control device that manages a network and an internal interface, and controls input/output of data from other devices. Specifically, the communication interface 306 is coupled to other devices via a network through a communication line. As the communication interface 306, for instance, a modem or a LAN adapter may be adopted.

In a case where the administrator of the message distribution device 101 directly operates the message distribution device 101, the message distribution device 101 may include hardware such as a display, a keyboard, and a mouse. In addition, the staff-in-charge terminals 221-A to F each include a CPU, a ROM, a RAM, a disk drive, a disk, a communication interface, a display, a keyboard, and a mouse.

(Example Functional Configuration of Message Distribution Device 101)

Figure 4:
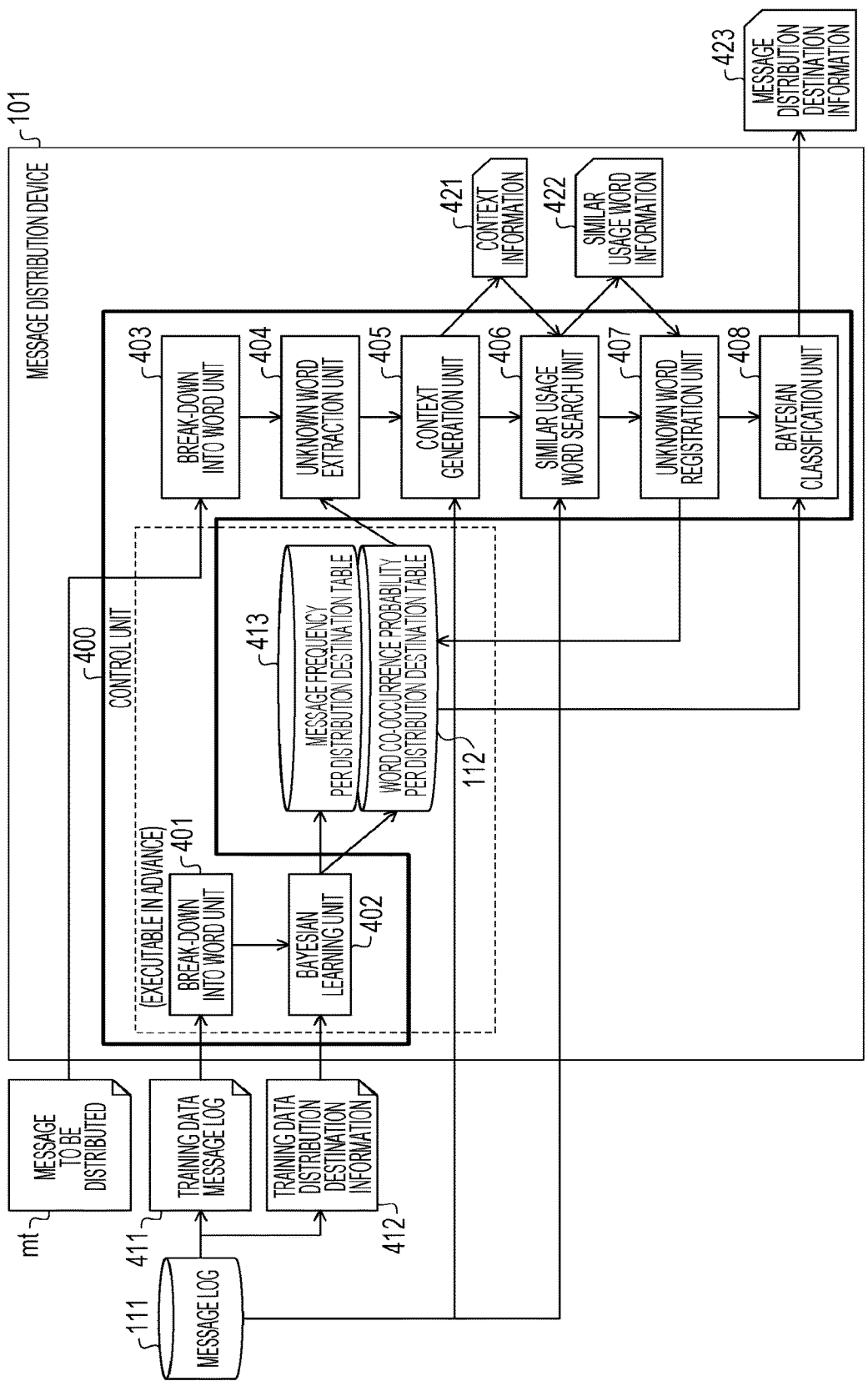
FIG. 4 is a diagram illustrating an example of a functional configuration of a message distribution device, according to an embodiment.

FIG. 4 is an explanatory diagram illustrating an example functional configuration of the message distribution device 101. The message distribution device 101 includes a control unit 400. The control unit 400 includes a break-down into word unit 401, a Bayesian learning unit 402, a break-down into word unit 403, an unknown word extraction unit 404, a context generation unit 405, a similar usage word search unit 406, and an unknown word registration unit 407. The control unit 400 implements the function of each unit by executing a program stored in a storage device by the CPU 301. The storage device is specifically the ROM 302, the RAM 303, or the disk 305 illustrated in FIG. 3, for instance. Also, a result of processing performed by each unit is stored in the register of the CPU 301, or the cache memory of the CPU 301.

Also, the message distribution device 101 is accessible to the message log 111 and the word co-occurrence probability per distribution destination table 112. The message log 111 and the word co-occurrence probability per distribution destination table 112 are stored in a storage device such as the RAM 303 or the disk 305. Also, the message distribution device 101 is accessible, as input data, to the message mt to be distributed, training data message log 411, and training data distribution destination information 412. The message mt to be distributed, the training data message log 411, and the training data distribution destination information 412 are stored in a storage device such as the RAM 303 or the disk 305.

Also, the message distribution device 101 generates context information 421 and similar usage word information 422 as intermediate data. The context information 421 and the similar usage word information 422 are stored in a storage device such as the RAM 303 or the disk 305. Also, the message distribution device 101 outputs message distribution destination information 423. The message distribution device 101 outputs the message distribution destination information 423 to a storage device such as the RAM 303 or the disk 305, or the communication interface 306.

The break-down into word unit 401 and the Bayesian learning unit 402 included in the range surrounded by a dashed line rectangle in FIG. 4 may be executed before the operation starts. The break-down into word unit 401 breaks down each message of the training data message log 411 into words. The Bayesian learning unit 402 updates the word co-occurrence probability per distribution destination table 112 and the message frequency per distribution destination table 413, based on the words broken down by the break-down into word unit 401 and the training data distribution destination information 412.

The break-down into word unit 403 breaks downs the message mt to be distributed into words. Out of the words broken down by the break-down into word unit 403, the unknown word extraction unit 404 extracts an unknown word that is not included in the multiple words registered in the word co-occurrence probability per distribution destination table 112.

Figure 5:
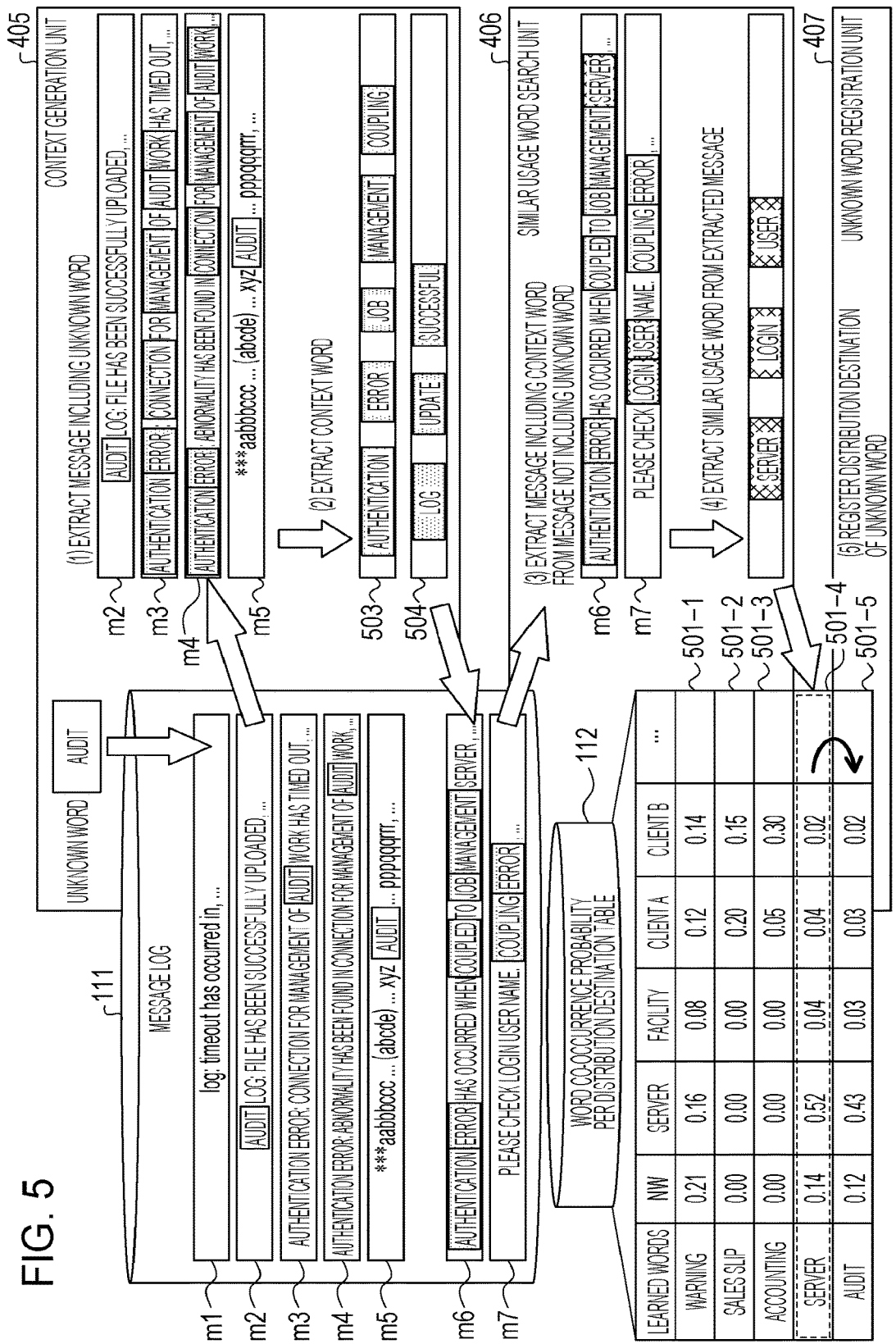
FIG. 5 is a diagram illustrating an example of processing of each function of a message distribution device, according to an embodiment.

When unknown words are present in the words included in the message to be distributed at a predetermined ratio or greater, the context generation unit 405 generates a context, specifically, extracts context words from the first message group including the unknown words in the message log 111. An example of extraction of context words by the context generation unit 405 is illustrated in FIG. 5.

For instance, the context generation unit 405 may extract multiple combinations of context words which are words included in each message of the first message group and having a co-occurrence probability at a predetermined threshold or greater. Here, for example, the co-occurrence probability of two words may be obtained by dividing the number of occurrences of both words in a message by the number of occurrences of one of the words in a message.

Also, the context generation circuitry 405 may extract a first permutation out of permutations of the words included in each message of the first message group, as a candidate combination of the context words, where the first permutation is a permutation whose head word having a highest number of occurrences in the first message group. Next, as the co-occurrence probability of the words included in the first permutation, the context generation unit 405 calculates a ratio of the number of occurrences of all the words of the first permutation being included in the first message group, to the number of occurrences of the head word of the first permutation being included in the first message group. When the calculated co-occurrence probability of the words included in the first permutation is a predetermined threshold or greater, the context generation unit 405 extracts the first permutation as a combination of the context words.

The similar usage word search unit 406 extracts messages including the context words, from the second message group not including the unknown words in the message log 111, and searches for a similar usage word which is a common word included in the extracted messages. An example of search of a similar usage word performed by the similar usage word search unit 406 is illustrated in FIG. 5.

Also, when multiple combinations of the context words are present, for each combination of the multiple combinations, the similar usage word search unit 406 extracts a similar usage word whose co-occurrence probability with all the context words included in the combination is a predetermined threshold or greater. The predetermined threshold may be the same value as or may be different from the predetermined threshold in the context generation unit 405.

The unknown word registration unit 407 determines whether or not the extracted similar usage word is included in the multiple words registered in the word co-occurrence probability per distribution destination table 112. When the similar usage word is included in the above-mentioned multiple words, the unknown word registration unit 407 calculates a co-occurrence probability for each distribution destination of the unknown word, based on the co-occurrence probability for each distribution destination of the similar usage word registered in the word co-occurrence probability per distribution destination table 112. The unknown word registration unit 407 then registers the calculated co-occurrence probability for each distribution destination of the unknown word, in the word co-occurrence probability per distribution destination table 112.

Also, the unknown word registration unit 407 may calculate a co-occurrence probability for each distribution destination of the unknown word as the product of the context score described in FIG. 1 and the co-occurrence probability for each distribution destination of the similar usage word registered in the word co-occurrence probability per distribution destination table 112. The unknown word registration unit 407 calculates a context score, based on the number of context words included in each combination of multiple combinations of the context words, and the number n of context words in a combination having a maximum number of context words among the multiple combinations. For instance, the unknown word registration unit 407 may calculate a context score as (the number of context words included in each combination/(n+1)) or (the number of context words included in each combination/(n+1))^2. Alternatively, the unknown word registration unit 407 may calculate a context score as log (the number of context words included in each combination/(n+1)+1), where the base has a value greater than 1.

Also, although the unknown word registration unit 407 calculates a context score as the number by which the co-occurrence probability for each distribution destination of the similar usage word is multiplied, the unknown word registration unit 407 may calculate a context score as the number by which the co-occurrence probability for each distribution destination of the similar usage word is divided. In this case, the unknown word registration unit 407 only has to use the reciprocal of the above-described context score.

For each distribution destination, the Bayesian classification unit 408 calculates a probability that the message mt to be distributed is distributed to the distribution destination, based on the word co-occurrence probability per distribution destination table 112 and the message frequency per distribution destination table 413. The Bayesian classification unit 408 determines that a distribution destination with the highest calculated probability is the distribution destination of the message mt to be distributed. The Bayesian classification unit 408 outputs the determined distribution destination as the message distribution destination information 423.

FIG. 5 is an explanatory diagram illustrating example processing of each function of the message distribution device 101. In FIG. 5, the processing performed by the context generation unit 405 to the unknown word registration unit 407 will be described more specifically. The message log 111 illustrated in FIG. 5 includes messages m1 to m7. Also, the word co-occurrence probability per distribution destination table 112 illustrated in FIG. 5 includes entries 501-1 to 4. It is assumed in FIG. 5 that the unknown word extraction unit 404 has extracted [audit] as the unknown word. In FIG. 5, the unknown word [audit] is illustrated by a white rectangle.

As illustrated in (1) of FIG. 5, the context generation unit 405 extracts the messages m2 to m5 each including the unknown word, from the message log 111. Next, as illustrated in (2) of FIG. 5, the context generation unit 405 extracts a common word in the extracted messages m2 to m5 as the context words. In the example of FIG. 5, the context generation unit 405 extracts a combination 503, 504 as the combination of context words. The combination 503 includes [AUTHENTICATION], [ERROR], [JOB], [MANAGEMENT], and [COUPLING] as context words. The combination 504 includes [log], [update], and [success] as context words. In FIG. 5, [AUTHENTICATION], [ERROR], [JOB], [MANAGEMENT], [COUPLING], [LOG], [UPDATE], and [SUCCESS] as the context words are illustrated by a lightly shaded rectangle.

As illustrated in (3) of FIG. 5, the similar usage word search unit 406 extracts messages m6, m7 each including some context words from messages each not including the unknown word. Next, the similar usage word search unit 406 extracts a common word in the extracted messages m6, m7 as a similar usage word. In the example of FIG. 5, the similar usage word search unit 406 extracts [SERVER], [LOGIN], AND [USER] as similar usage words. In FIG. 5, [SERVER], [LOGIN], and [USER] as the similar usage words are illustrated by a darkly shaded rectangle.

Next, as illustrated in (4) of FIG. 5, when the similar usage words include a word registered in the word co-occurrence probability per distribution destination table 112, the unknown word registration unit 407 utilizes the distribution destination of the word as a distribution destination of the unknown word. In the example of FIG. 5, since the similar usage word [SERVER] is registered in the entry 501-4 of the word co-occurrence probability per distribution destination table 112, the unknown word registration unit 407 registers the entry 501-5, based on the entry 501-4. Next, an example of stored data in a table accessed by the message distribution device 101 will be described using FIGS. 6 to 13.

Figure 6:
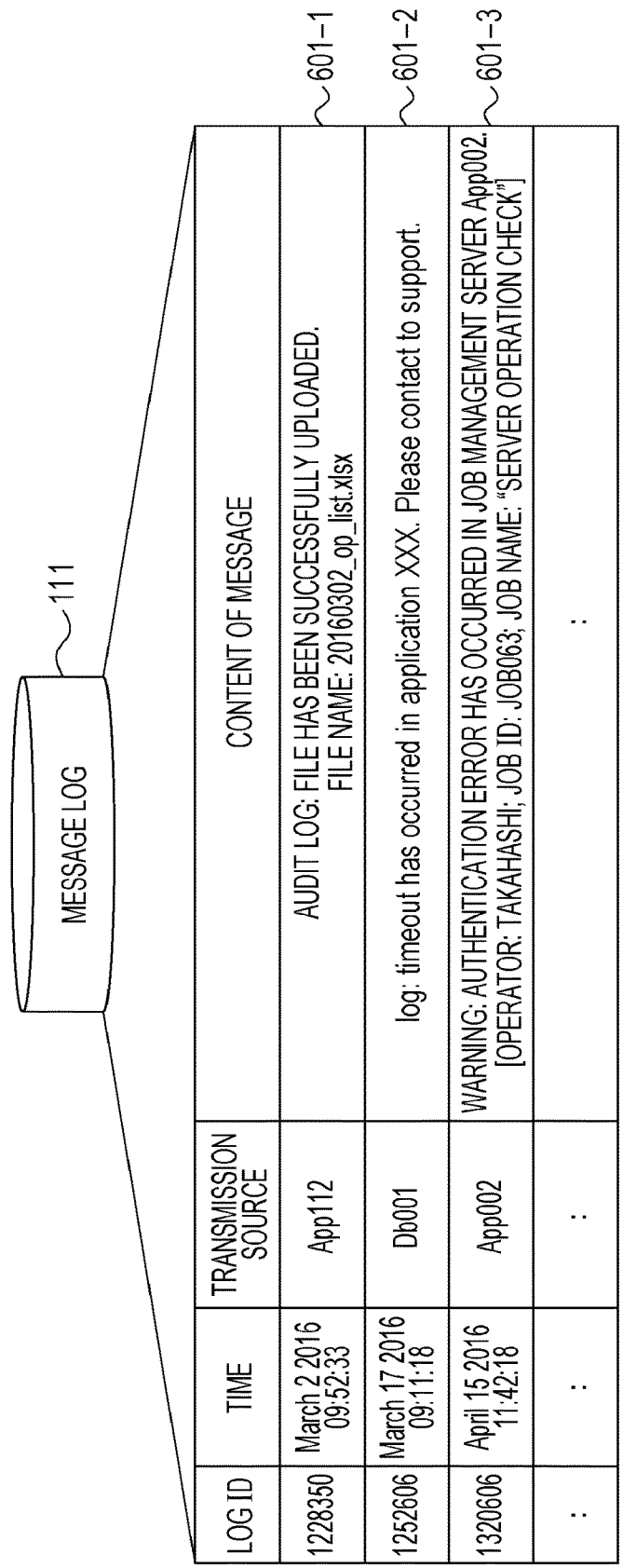
FIG. 6 is a diagram illustrating an example of stored data in a message log, according to an embodiment.

FIG. 6 is an explanatory table illustrating an example of stored data in the message log 111. The message log 111 has one entry for each log. The message log 111 illustrated in FIG. 6 has entries 601-1 to 3.

The message log 111 includes fields called log ID, time, transmission source, and message content. The log ID field stores a value that identifies a log. The time field stores a value that indicates a time at which the log is received. The transmission source stores a value that identifies a transmission source of the log. The message content stores a character string that indicates the content of the relevant message.

FIG. 7 is an explanatory table illustrating an example of stored data in the training data message log 411. The training data message log 411 is data obtained by extracting the log IDs and the message contents from entries, forming a subset of the message log 111, for which a distribution destination has been determined.

The training data message log 411 illustrated in FIG. 7 has entries 701-1, 2. For instance, the entry 701-1 is extracted from the entry 601-3.

Figure 8:
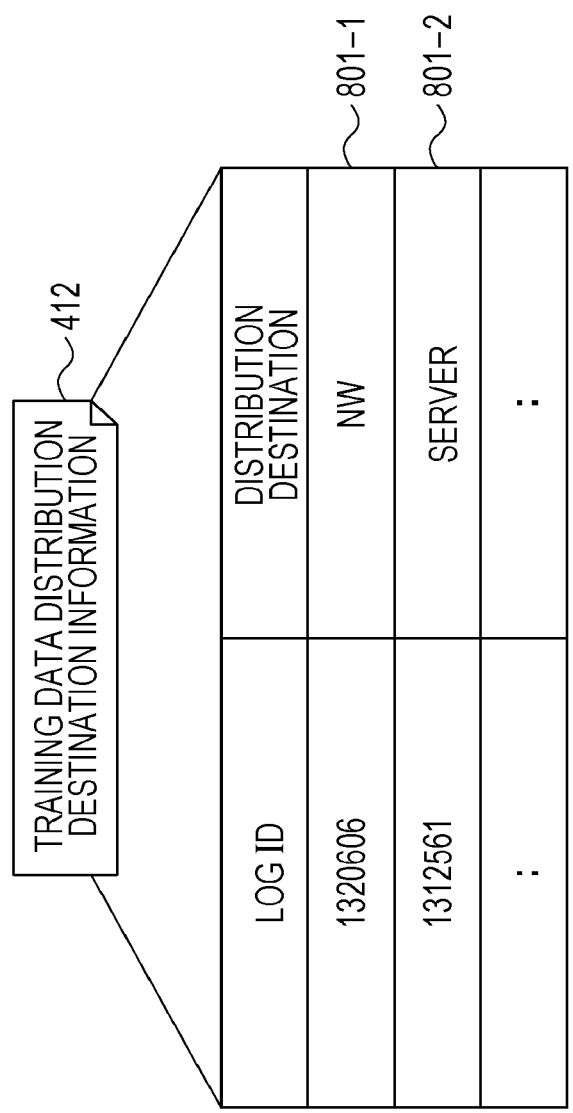
FIG. 8 is a diagram illustrating an example of stored data in training data distribution destination information, according to an embodiment.

FIG. 8 is an explanatory table illustrating an example of stored data in the training data distribution destination information 412. The training data distribution destination information 412 stores a distribution destination corresponding to each of the messages stored in the training data message log 411. The training data distribution destination information 412 illustrated in FIG. 8 has entries 801-1, 2.

The training data distribution destination information 412 includes fields called log ID and distribution destination. The log ID field stores a value that indicates a log ID. The distribution destination field stores a character string that identifies a distribution destination of the log. For instance, the entry 801-1 indicates that the log ID "1320606" has the distribution destination of "NW", that is, the staff-in-charge terminal 221-F.

Figure 9:
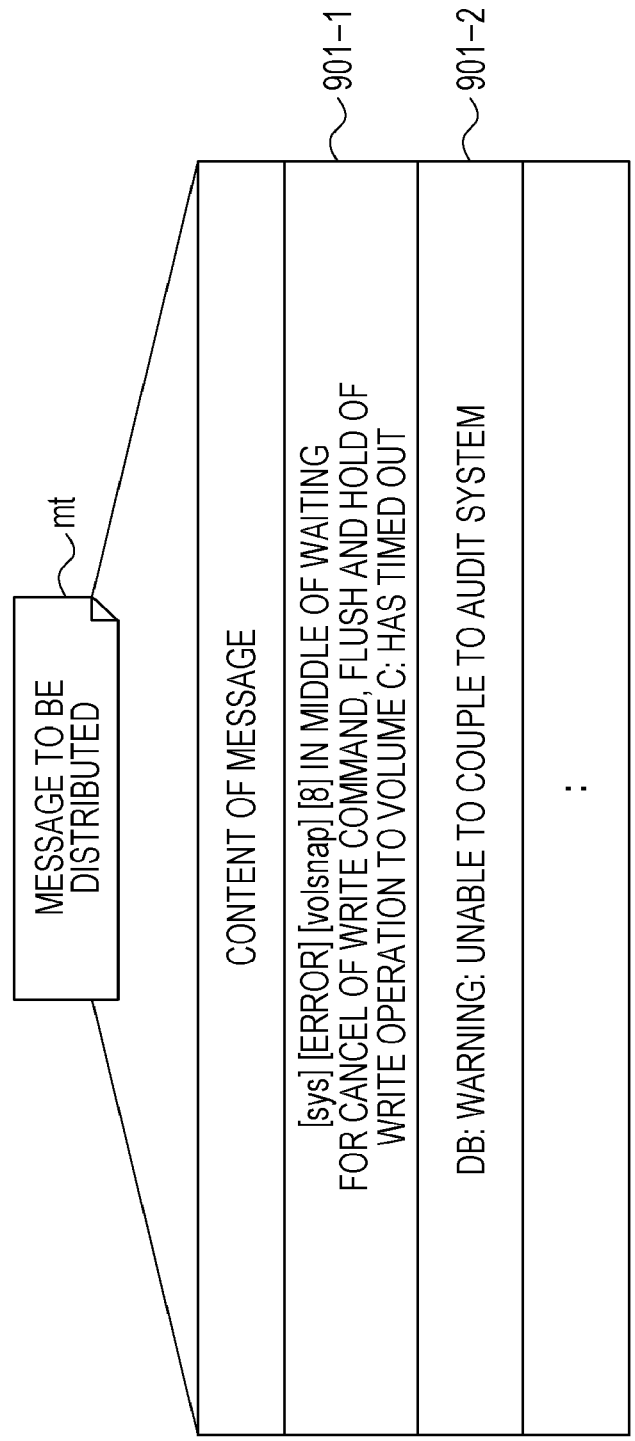
FIG. 9 is a diagram illustrating an example of stored data in a message to be distributed, according to an embodiment.

FIG. 9 is an explanatory table illustrating an example of stored data in the message mt to be distributed. The message mt to be distributed is a message for which a distribution destination is to be determined. The message mt to be distributed illustrated in FIG. 9 has entries 901-1, 2.

The message mt to be distributed includes a field called a message content. The message content field stores a character string that indicates a message for which a distribution destination is to be determined.

Figure 10:
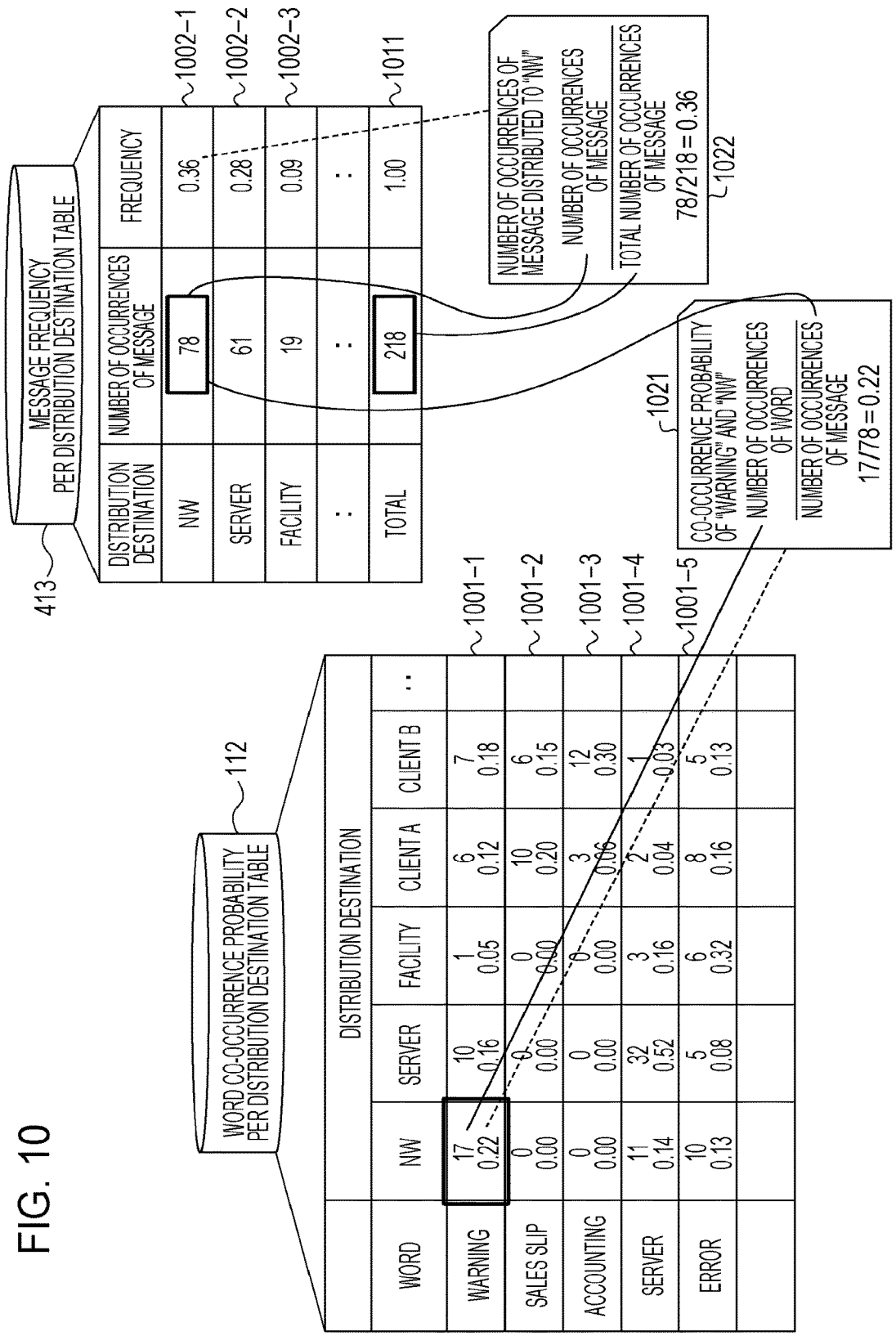
FIG. 10 is a diagram illustrating an example of stored data in a word co-occurrence probability per distribution destination table and a message frequency per distribution destination table, according to an embodiment.

FIG. 10 is an explanatory diagram illustrating an example of stored data in the word co-occurrence probability per distribution destination table 112 and the message frequency per distribution destination table 413. The word co-occurrence probability per distribution destination table 112 has one entry for each word. The word co-occurrence probability per distribution destination table 112 illustrated in FIG. 10 has entries 1001-1 to 5.

The word co-occurrence probability per distribution destination table 112 includes fields called word and distribution destination. The distribution destination field includes subfields each of which is for a distribution destination. In the example of FIG. 10, the word co-occurrence probability per distribution destination table 112 includes subfields called "NW", "SERVER", "FACILITY", "CLIENT A", "CLIENT B", . . . as the distribution destinations. Each of the subfields for distribution destinations store two values in an upper part and a lower part of the subfield. The value presented in the upper part of the subfield indicates the number of occurrences of a word registered in the word field, in messages distributed to a distribution destination. Also, the value presented in the lower part of the subfield indicates the co-occurrence probability of a word registered in the word field, for a distribution destination.

The message frequency per distribution destination table 413 has entries 1002_1 to 3, . . . , entry 1011. The message frequency per distribution destination table 413 has fields called distribution destination, the number of occurrences of message, and frequency. The distribution destination field stores a character string that identifies a distribution destination. The number of occurrences of message field stores the number of occurrences of a message which has been distributed to a distribution destination. The frequency field stores a frequency of a message which has been distributed to a distribution destination.

Also, the number of occurrences of message field of the entry 1011 stores the total number of occurrences of a message at a distribution destination. Similarly, the frequency field of the entry 1011 stores the total value of the frequency at each distribution destination.

For instance, in processing 1021 of calculating the co-occurrence probability of "WARNING" and "NW", the message distribution device 101 calculates (the number of occurrences of word "WARNING" in messages distributed to "NW"/the number of occurrences of messages distributed to "NW"). As illustrated in FIG. 10, since the number of occurrences of word "WARNING" is 17 and the number of occurrences of the message distributed to "NW" is 78, the message distribution device 101 calculates the co-occurrence probability of "WARNING" and "NW" as 17/78=0.22.

Also, in processing 1022 of calculating the frequency of a message distributed to "NW", the message distribution device 101 calculates (the number of occurrences of messages distributed to "NW"/the total number of occurrences of messages). As illustrated in FIG. 10, since the number of occurrences of messages distributed to "NW" is 78 and the total number of occurrences of messages is 218, the message distribution device 101 calculates the frequency of the message distributed to "NW" as 78/218=0.36.

FIG. 11 is an explanatory table illustrating an example of stored data in the context information 421. The context information 421 illustrated in FIG. 11 has entries 1101-1 to 3.

The context information 421 includes fields called unknown word, context, and context score. The unknown word field stores an unknown word. The context field stores a set of words which are extracted from the messages including the unknown word, and which form context. The context score field stores a context score.

FIG. 12 is an explanatory table illustrating an example of stored data in the similar usage word information 422. The similar usage word information 422 illustrated in FIG. 12 has entries 1201-1 to 4.

The similar usage word information 422 includes fields called unknown word, context word, and similar usage word. The unknown word field stores an unknown word. The context word field stores a set of words which form context. Another words used in the same context as an unknown word are stored in the similar usage word field.

Figure 13:
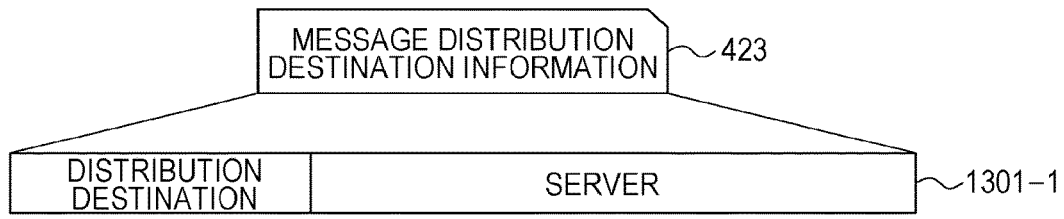
FIG. 13 is a diagram illustrating an example of stored data in message distribution destination information, according to an embodiment.

FIG. 13 is an explanatory table illustrating an example of stored data in the message distribution destination information 423. The message distribution destination information 423 illustrated in FIG. 13 has an entry 1301-1. The message distribution destination information 423 stores information that identifies a distribution destination of the message mt to be distributed.

Next, the processing performed by message distribution device 101 will be described using FIGS. 14 to 26, and FIGS. 28, 30, 32, 34, 36, and 38. FIGS. 27, 29, 31, 33, 35, and 37 illustrate a state of data during the processing performed by the message distribution device 101.

Figure 14:
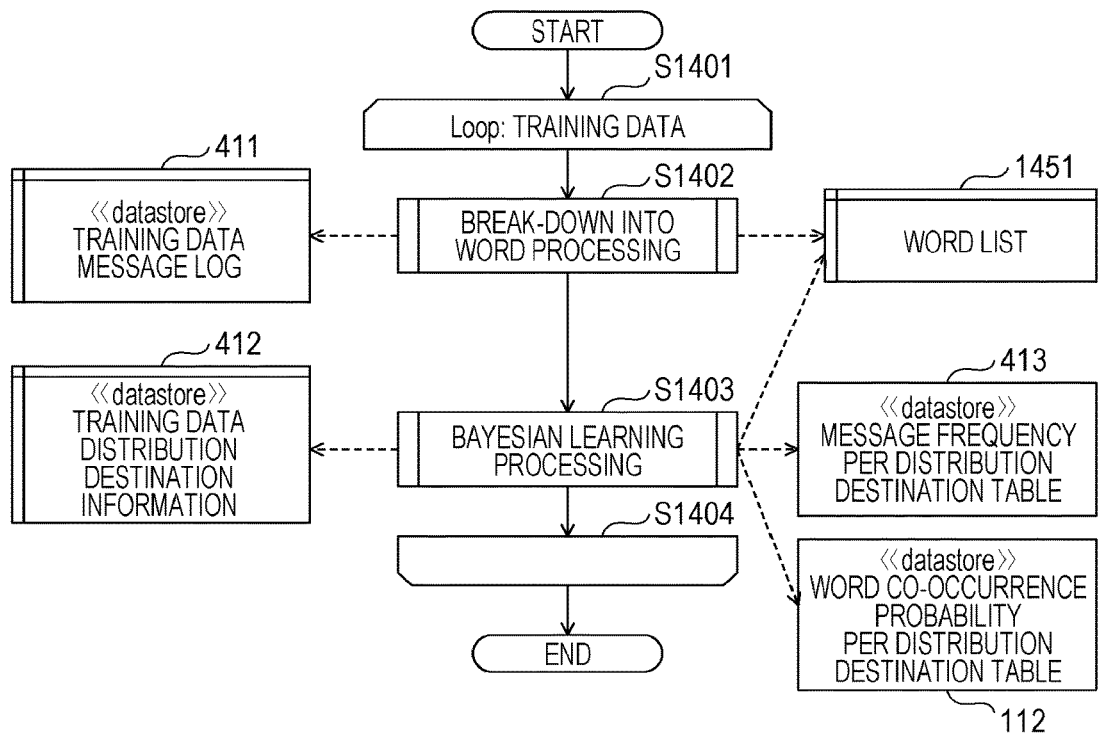
FIG. 14 is a diagram illustrating an example of an operational flowchart for distribution destination learning processing, according to an embodiment.

FIG. 14 is a flowchart illustrating an example of distribution destination learning processing. The message distribution device 101 performs distribution destination learning processing each time a message which is to be learnt is accumulated. For instance, the message distribution device 101 performs the distribution destination learning processing at a specific time every month.

The message distribution device 101 repeats the processing in steps S1401 to S1404 for each training data. Here, the training data is a message that is identified in the training data message log 411, and the training data distribution destination information 412. Specifically, the message distribution device 101 selects one message at a time from the message group forming the training data group included in the training data message log 411, and performs the processing in step S1402 and S1403 for the selected message.

As internal processing repeated for the processing in steps S1401 to S1404, the message distribution device 101 performs break-down into word processing on the training data selected from the training data message logs 411, and obtains word list 1451 (step S1402). The break-down into word processing will be described with reference to FIG. 16. The word list 1451 is a word group included in the selected training data.

The message distribution device 101 refers to the word list 1451, and performs the Bayesian learning processing on the training data selected from the training data distribution destination information 412 (step S1403). The Bayesian learning processing will be described with reference to FIG. 18. Also, in the Bayesian learning processing, the message distribution device 101 updates the message frequency per distribution destination table 413, and the word co-occurrence probability per distribution destination table 112.

When repeating processing in steps S1401 to S1404 is exited, the message distribution device 101 completes the distribution destination learning processing.

Figure 15:
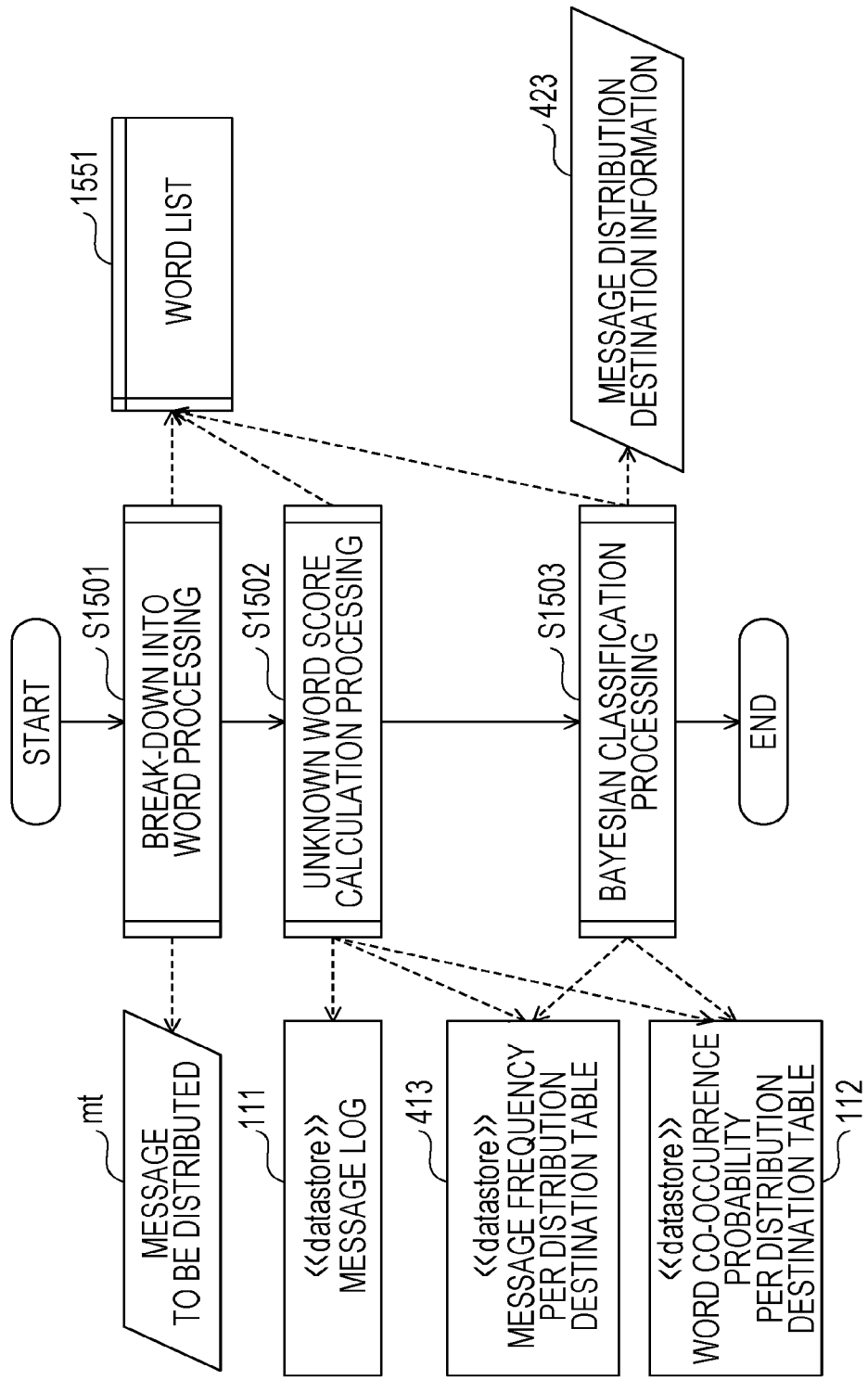
FIG. 15 is a diagram illustrating an example of an operational flowchart for distribution destination determination processing, according to an embodiment.

FIG. 15 is a flowchart illustrating an example of distribution destination determination processing. The distribution destination determination processing is performed when the message mt to be distributed occurs.

The message distribution device 101 performs breakdown into word processing on the message mt to be distributed, and obtains word list 1551 (step S1501). The word list 1551 is a word group included in the message mt to be distributed.

Next, the message distribution device 101, with reference to the word list 1551 and the message log 111, performs unknown word score calculation processing (step S1502). The unknown word score calculation processing will be described with reference to FIGS. 21 and 22. Also, in the unknown word score calculation processing, the message distribution device 101 updates the message frequency per distribution destination table 413, and the word co-occurrence probability per distribution destination table 112.

The message distribution device 101 then, with reference to the word list 1551, the message frequency per distribution destination table 413, and the word co-occurrence probability per distribution destination table 112, performs Bayesian classification processing (step S1503), and obtains the message distribution destination information 423. The Bayes classification processing will be described with reference to FIG. 38. Upon completion of the processing in step S1503, the message distribution device 101 completes the distribution destination determination processing.

Figure 16:
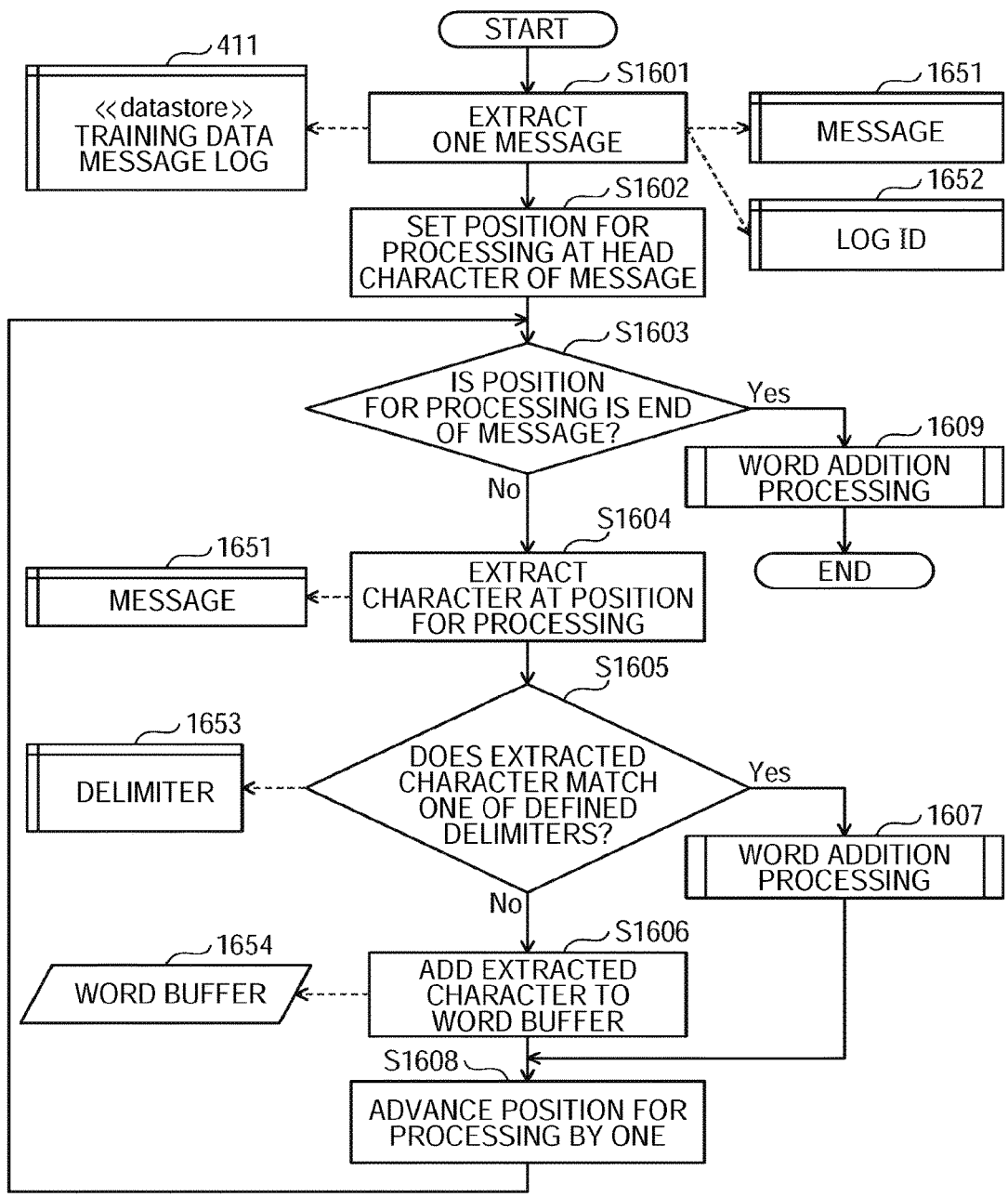
FIG. 16 is a diagram illustrating an example of an operational flowchart for break-down into word processing, according to an embodiment.

FIG. 16 is a flowchart illustrating an example of breakdown into word processing. The break-down into word processing is processing that is called from step S1402 or S1501. The break-down into word processing is also called from step S2403, S2501 described later. The message distribution device 101 extracts one message from the training data message log 411 (step S1601). Here, when the break-down into word processing is called from step S1501, the message distribution device 101 processes the message mt to be distributed as an extracted message.

The message distribution device 101 then stores the extracted message in the RAM 303 or the like as a message 1651, and stores a log ID corresponding to the extracted message in the RAM 303 or the like as a log ID 1652. Next, the message distribution device 101 sets the position of processing at the head character of the message 1651 (step S1602).

The message distribution device 101 determines whether or not the position of processing is the end of the message 1651 (step S1603). When the position of processing is not the end of the message 1651 (No in step S1603), the message distribution device 101 refers to the message 1651, and retrieves a character at the position of processing (step S1604). The message distribution device 101 determines whether or not the retrieved character matches one of defined delimiters 1653 (step S1605).

When the retrieved character does not match any of defined delimiters 1653 (No in step S1605), the message distribution device 101 adds the retrieved character to a word buffer 1654 (step S1606). On the other hand, when the retrieved character matches one of defined delimiters 1653 (Yes in step S1605), the message distribution device 101 performs word addition processing (step S1607). The word addition processing will be described in FIG. 17.

After the completion of the processing in step S1606 or step S1607, the message distribution device 101 advances the position of processing by one (step S1608). The flow of the message distribution device 101 proceeds to the processing in step S1603.

On the other hand, when the position of processing is the end of the message (Yes in step S1603), the message distribution device 101 performs the word addition processing (step S1609). After the completion of the processing in step S1609, the message distribution device 101 completes the break-down into word processing.

Figure 17:
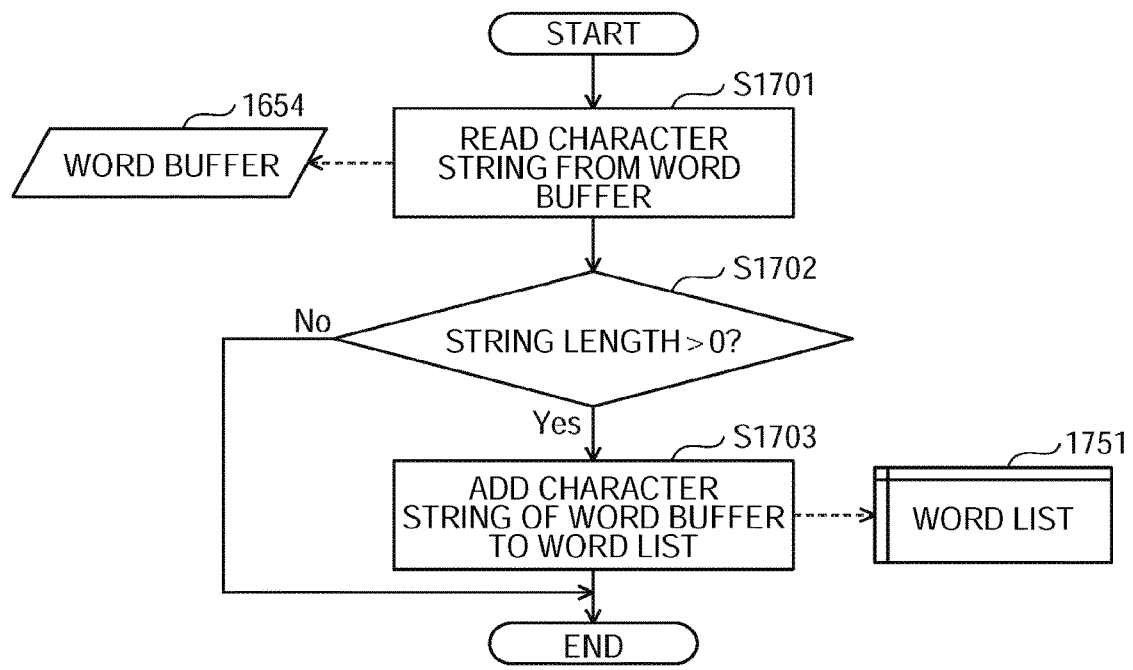
FIG. 17 is a diagram illustrating an example of an operational flowchart for word addition processing, according to an embodiment.

FIG. 17 is a flowchart illustrating an example of word addition processing. The word addition processing is processing that is called from step S1607 and S1609. The message distribution device 101 reads a character string from the word buffer 1654 (step S1701). Next, the message distribution device 101 determines whether or not the read character string has a length larger than zero (step S1702). When the read character string has a length greater than zero (Yes in step S1702), the message distribution device 101 adds the character string in the word buffer 1654 to a word list 1751 (step S1703). The word list 1751 is a word list obtained when the break-down into word processing is performed.

After the completion of the processing in step S1703, or when the read character string has a length of zero (No in step S1702), the message distribution device 101 completes the word addition processing.

Figure 18:
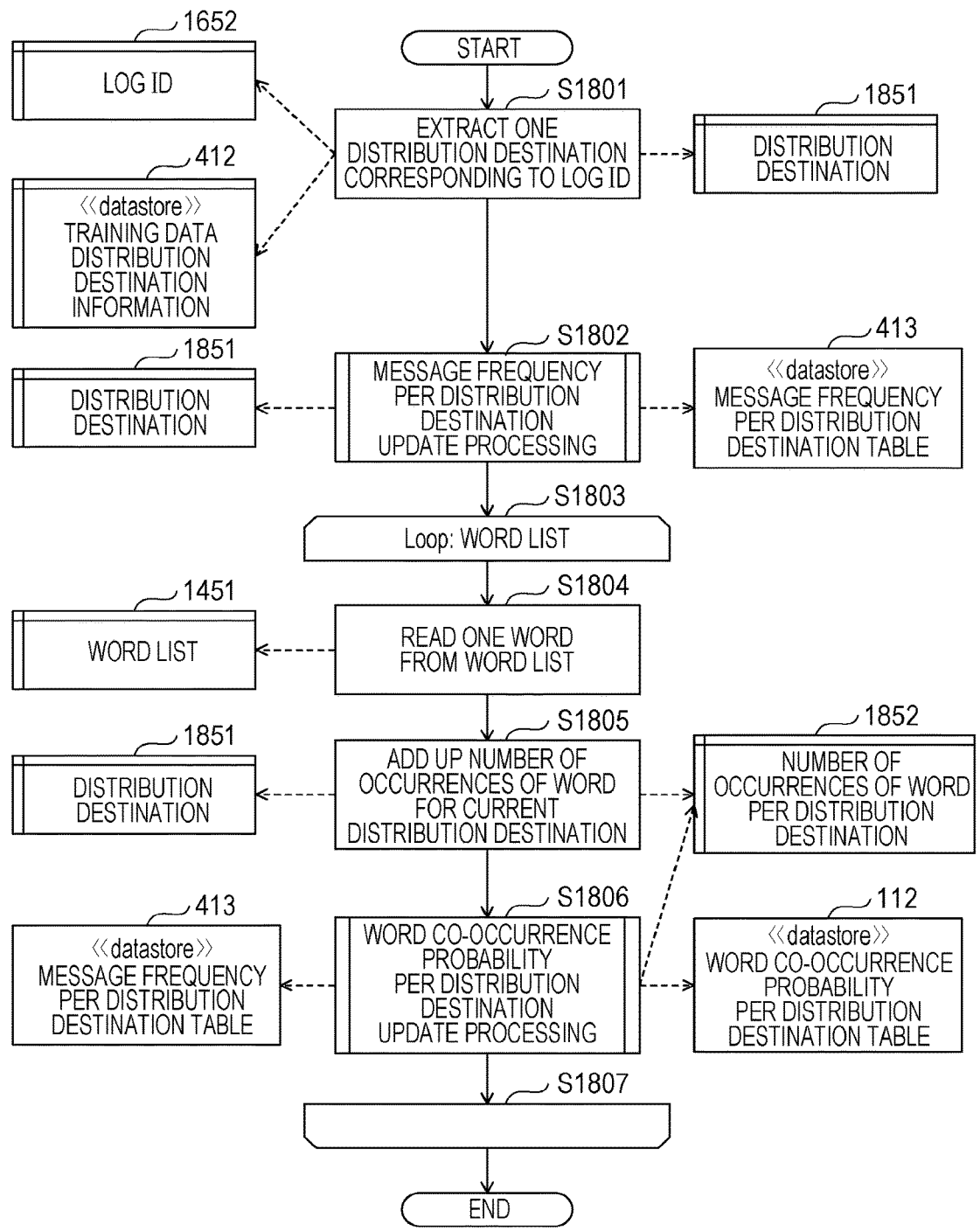
FIG. 18 is a diagram illustrating an example of an operational flowchart for Bayesian learning processing, according to an embodiment.

FIG. 18 is a flowchart illustrating an example of Bayesian learning processing. The Bayesian learning processing is processing that is called from step S1403. The message distribution device 101 refers to the training data distribution destination information 412, and extracts one distribution destination corresponding to the log ID obtained in the processing in step S1601 (step S1801). The message distribution device 101 stores the extracted distribution destination in the RAM 303 or the like as a distribution destination 1851.

Next, message distribution device 101 performs message frequency update processing per distribution destination for the distribution destination 1851 (step S1802). The message frequency update processing per distribution destination will be described in FIG. 19. Also, in the message frequency update processing per distribution destination, the message distribution device 101 updates the message frequency per distribution destination table 413.

The message distribution device 101, repeats the processing in steps S1803 to S1807 for each of words included in the word list 1451. As internal processing repeated for the processing in steps S1803 to S1807, the message distribution device 101 reads one word from the word list 1451 (step S1804). Next, the message distribution device 101 increments the number of occurrences of word for the current distribution destination designated by the distribution destination 1851 (step S1805). The message distribution device 101 stores a result of the increment as the number of occurrences of word per distribution destination 1852. The message distribution device 101, with reference to the message frequency per distribution destination table 413, performs word co-occurrence probability update processing per distribution destination (step S1806), and updates the word co-occurrence probability per distribution destination table 112.

When repeating processing in steps S1803 to S1807 is exited, the message distribution device 101 completes the Bayesian learning processing.

Figure 19:
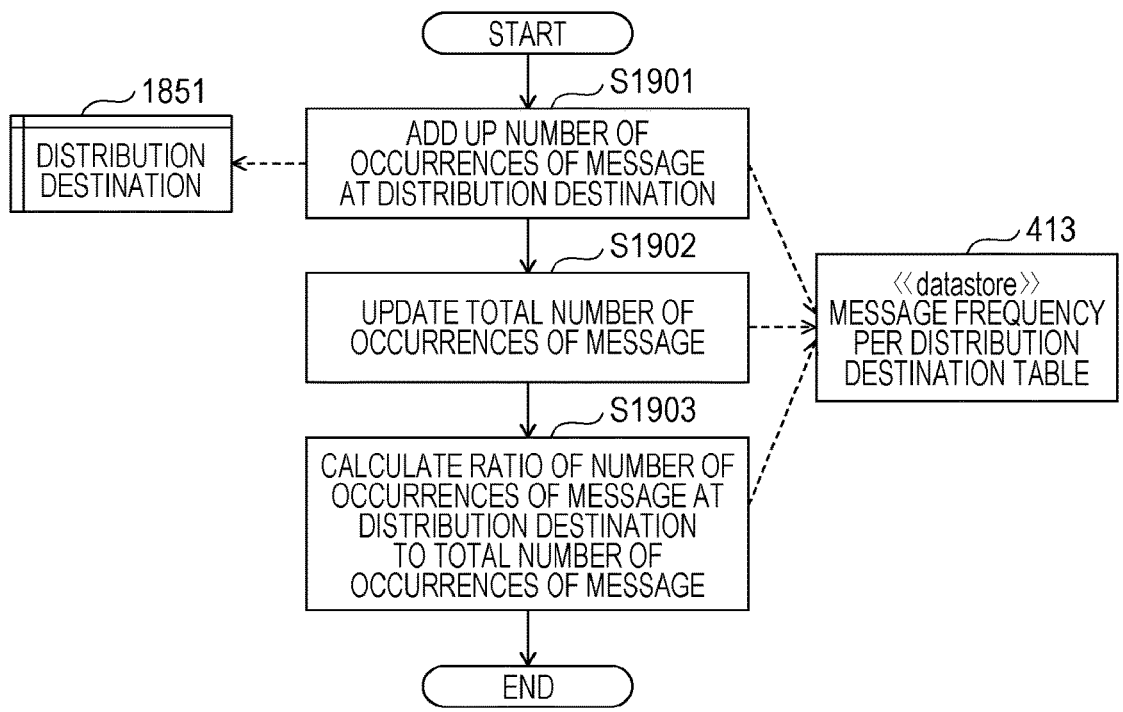
FIG. 19 is a diagram illustrating an example of an operational flowchart for message frequency update processing per distribution destination, according to an embodiment.

FIG. 19 is a flowchart illustrating an example of message frequency update processing per distribution destination. The message frequency update processing per distribution destination is processing that is called from step S1802. The message distribution device 101 increments the number of occurrences of a message at the distribution destination 1851 in the message frequency per distribution destination table 413 (step S1901). Next, the message distribution device 101 updates the total number of occurrences of a message in the message frequency per distribution destination table 413 (step S1902). The message distribution device 101 calculates a ratio of the number of occurrences of a message at a distribution destination to the total number of occurrences of a message (step S1903), and updates the frequency field in the message frequency per distribution destination table 413 with the calculated value.

After the completion of the processing in step S1903, the message distribution device 101 completes the message frequency update processing per distribution destination.

Figure 20:
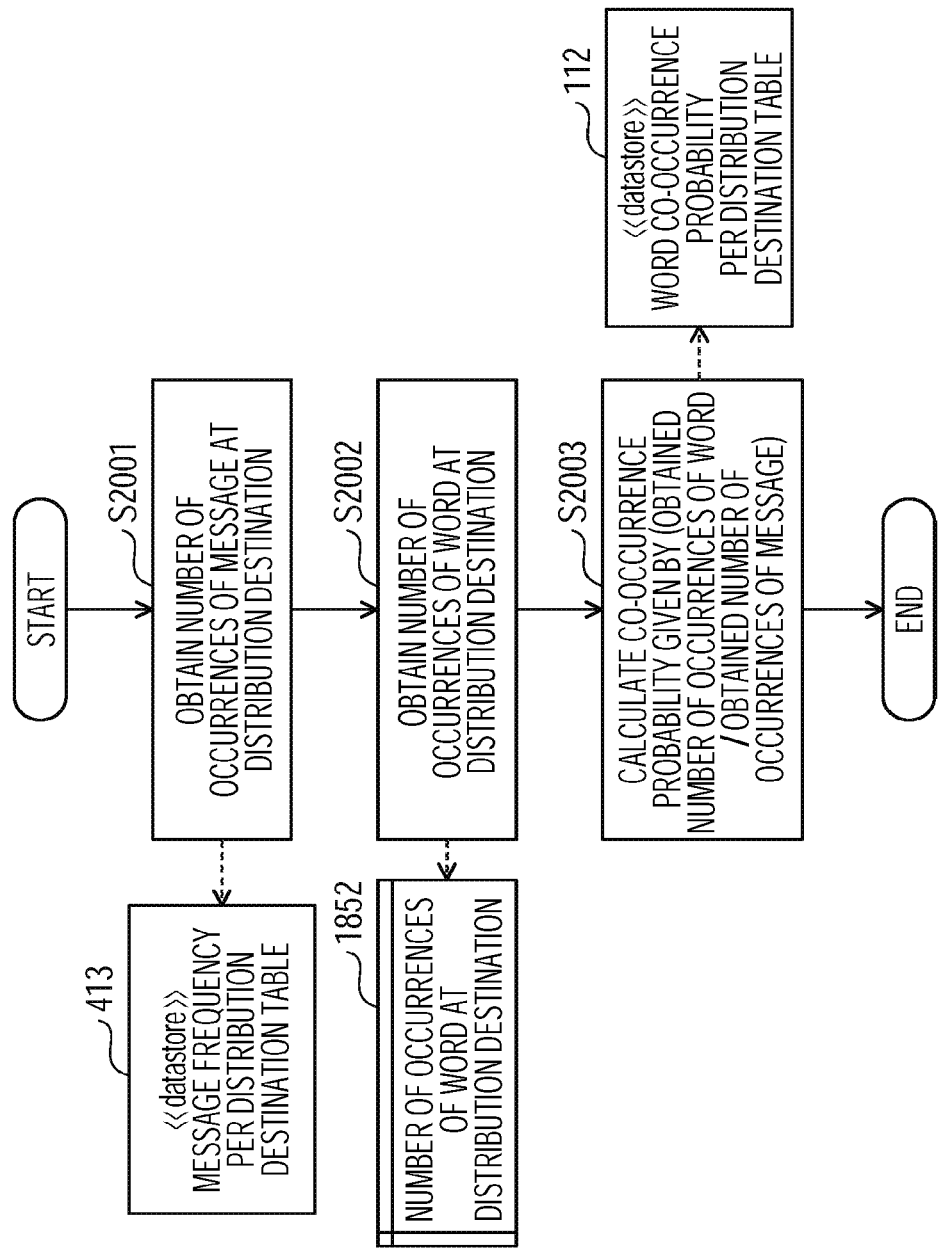
FIG. 20 is a diagram illustrating an example of an operational flowchart for word co-occurrence probability update processing per distribution destination, according to an embodiment.

FIG. 20 is a flowchart illustrating an example of word co-occurrence probability update processing per distribution destination. The word co-occurrence probability update processing per distribution destination is processing that is called from step S1806. The message distribution device 101 obtains the number of occurrences of a message at a distribution destination from the message frequency per distribution destination table 413 (step S2001). Next, the message distribution device 101 obtains the number of occurrences of a word at the distribution destination from the number of occurrences of word per distribution destination 1852 (step S2002). The message distribution device 101 calculates (the obtained number of occurrences of a word/the obtained number of occurrences of a message) as the co-occurrence probability (step S2003), and updates the word co-occurrence probability per distribution destination table 112 with the calculated value.

After the completion of the processing in step S2003, the message distribution device 101 completes the word co-occurrence probability update processing per distribution destination.

Figure 21:
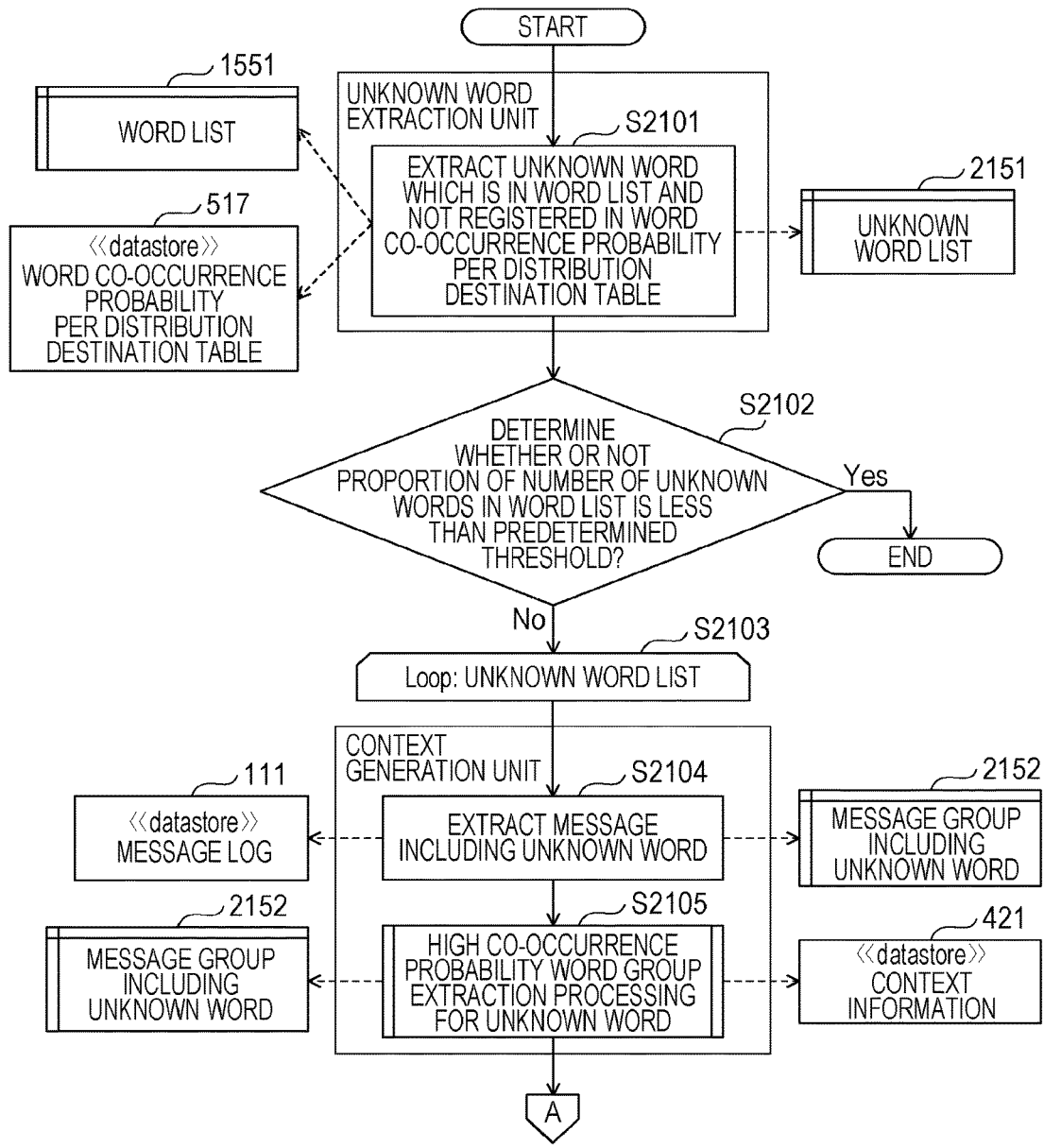
FIG. 21 is a diagram illustrating an example of an operational flowchart for unknown word score calculation processing, according to an embodiment.
Figure 22:
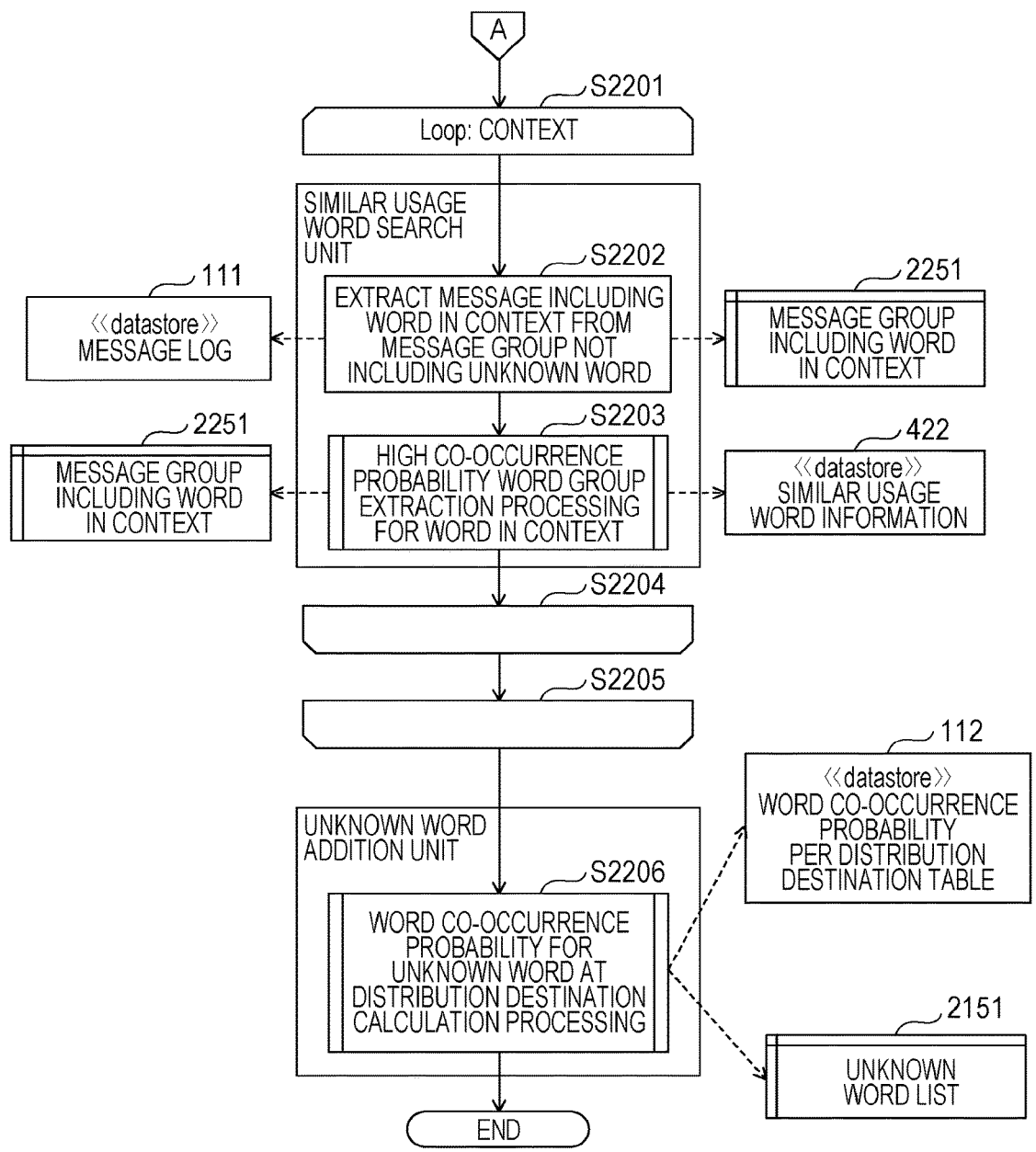
FIG. 22 is a diagram illustrating an example of an operational flowchart for unknown word score calculation processing, according to an embodiment.

FIG. 21 is a flowchart (part 1) illustrating an example of unknown word score calculation processing. FIG. 22 is a flowchart (part 2) illustrating the example unknown word score calculation processing. The unknown word score calculation processing is processing that is called from step S1502.

The message distribution device 101 causes the unknown word extraction unit 404 to extract, as an unknown word, a word which is in the word list 1551 and not registered in the word co-occurrence probability per distribution destination table 112 (step S2101). The message distribution device 101 adds the extracted word to an unknown word list 2151. Next, the message distribution device 101 determines whether or not the ratio of the number of unknown words to the number of words in the word list 1551 is less than a predetermined threshold (step S2102). When the ratio of the number of unknown words to the number of words in the word list 1551 is less than a predetermined threshold (Yes in step S2102), the message distribution device 101 determines that it is possible to properly identify a distribution destination under the present conditions, and completes the unknown word score calculation processing.

On the other hand, when the ratio of the number of unknown words to the number of words in the word list 1551 is a predetermined threshold or greater (No in step S2102), the message distribution device 101 repeats the processing in steps S2103 to S2205 for each of words included in the word list 1551. As internal processing repeated for the processing in steps S2103 to S2205, the message distribution device 101 causes the context generation unit 405 to extract a message including an unknown word from the message log 111 (step S2104). The message distribution device 101 stores the extracted message in the RAM 303 or the like as a message group 2152 including an unknown word. The extracted message is a message that is in the message log 111 and includes an unknown word. Therefore, the extracted message is a message other than messages serving as the training data registered in the training data message log 411 and the training data distribution destination information 412.

Next, the message distribution device 101 causes the context generation unit 405 to perform high co-occurrence probability word group extraction processing for the unknown word, with reference to the message group 2152 including an unknown word (step S2105), and obtains the context information 421. The high co-occurrence probability word group extraction processing for the unknown word will be described in FIG. 23.

The message distribution device 101 repeats the processing in steps S2201 to S2204 for each of entries in the context information 421. As internal processing repeated for the processing in steps S2201 to S2204, the message distribution device 101 causes the similar usage word search unit 406 to extract a message including a context word from a message group not including an unknown word (step S2202). Here, the message distribution device 101 stores the extracted message in the RAM 303 as a message group 2251 including a context word. Also, messages each not including an unknown word are messages obtained by excluding the message group 2152 including an unknown word from the message log 111.

Next, the message distribution device 101, with reference to the message group 2251 including a context word, performs the high co-occurrence probability word group extraction processing for the context word (step S2203). The high co-occurrence probability word group extraction processing for the context word will be described in FIG. 34. The message distribution device 101 is assumed to exit repeating processing in steps S2201 to S2204 and repeating processing in steps S2103 to S2205. In this case, the message distribution device 101 causes the unknown word registration unit 407 to perform the word co-occurrence probability calculation processing per distribution destination for an unknown word, with reference to the unknown word list 2151 (step S2206). The word co-occurrence probability calculation processing per distribution destination for an unknown word will be described in FIG. 36. Also, in the word co-occurrence probability calculation processing per distribution destination for an unknown word, the message distribution device 101 updates the word co-occurrence probability per distribution destination table 112.

After the completion of the processing in step S2206, the message distribution device 101 completes the unknown word score calculation processing.

Figure 23:
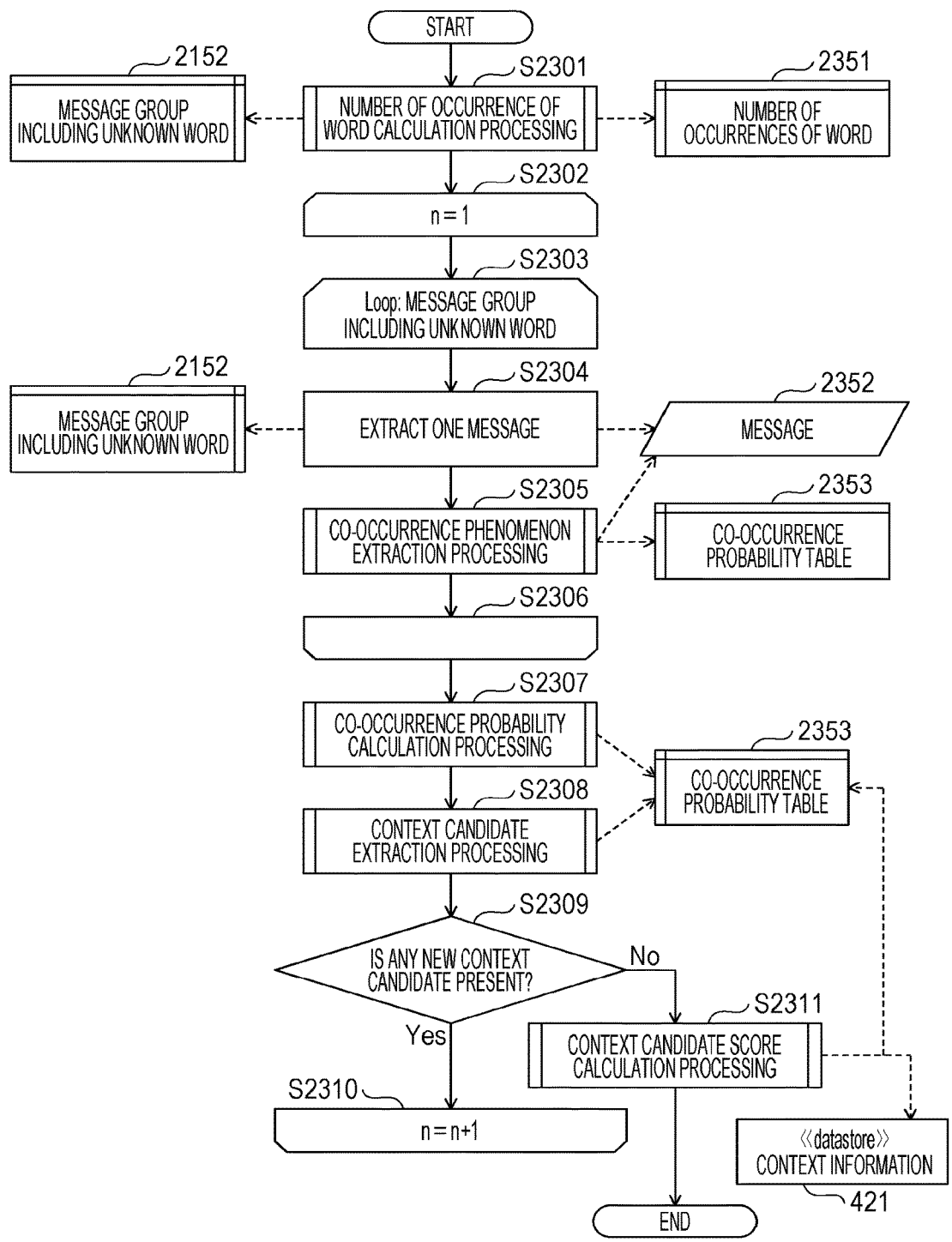
FIG. 23 is a diagram illustrating an example of an operational flowchart for high co-occurrence probability word group extraction processing for an unknown word, according to an embodiment.

FIG. 23 is a flowchart illustrating an example of high co-occurrence probability word group extraction processing for an unknown word. The high co-occurrence probability word group extraction processing for an unknown word is processing to extract a word group having a high co-occurrence probability with an unknown word. The high co-occurrence probability word group extraction processing for an unknown word is called from step S2105.

The message distribution device 101 performs number of occurrences of word calculation processing for the message group 2152 including an unknown word (step S2301), and obtains the number of occurrences of word 2351. The number of occurrences of word calculation processing will be described in FIG. 24.

Next, the message distribution device 101 sets the initial value of n at 1, sets an increment value at 1, and repeats the processing in steps S2302 to S2310. In addition, as internal processing repeated for the processing in steps S2302 to S2310, the message distribution device 101 repeats the processing in steps S2303 to S2306 for each of messages included in the message group 2152 including an unknown word. As internal processing repeated for the processing in steps S2303 to S2306, the message distribution device 101 extracts one message from the message group 2152 including an unknown word (step S2304). The message distribution device 101 stores the extracted message in the RAM 303 or the like as a message 2352.

Next, the message distribution device 101 performs co-occurrence phenomenon extraction processing for the message 2352 (step S2305), and updates a co-occurrence probability table 2353. The co-occurrence phenomenon extraction processing will be described in FIG. 25, FIG. 26. In executing coincidence phenomenon extraction processing for the first time, message distribution device 101 generates co-occurrence probability table 2353 by executing coincidence phenomenon extraction processing.

When repeating processing in steps S2303 to S2306 is exited, the message distribution device 101 performs co-occurrence probability calculation processing (step S2307). The co-occurrence probability calculation processing will be described in FIG. 28. Also, in the co-occurrence probability calculation processing, the message distribution device 101 updates the co-occurrence probability table 2353. The message distribution device 101 then performs context candidate extraction processing (step S2308). The context candidate extraction processing will be described in FIG. 30. In the context candidate extraction processing, the message distribution device 101 updates the co-occurrence probability table 2353.

Next, the message distribution device 101 determines whether or not a new context candidate is present (step S2309). Here, the context candidate refers to each entry of the co-occurrence probability table 2353. A new context candidate is an entry which is added to the co-occurrence probability table 2353 by the nth time processing in step S2305, and which has not been deleted by the nth time processing in step S2308.

When a new context candidate is present (Yes in step S2309), the message distribution device 101 increments n by one, and continues to repeat the processing in steps S2302 to S2310. On the other hand, when a new context candidate is not present (No in step S2309), repeating processing in steps S2302 to S2310 is exited, the message distribution device 101, with reference to the co-occurrence probability table 2353, performs context candidate score calculation processing (step S2311), and obtains the context information 421. After the completion of the processing in step S2311, the message distribution device 101 completes the high co-occurrence probability word group extraction processing for an unknown word.

Figure 24:
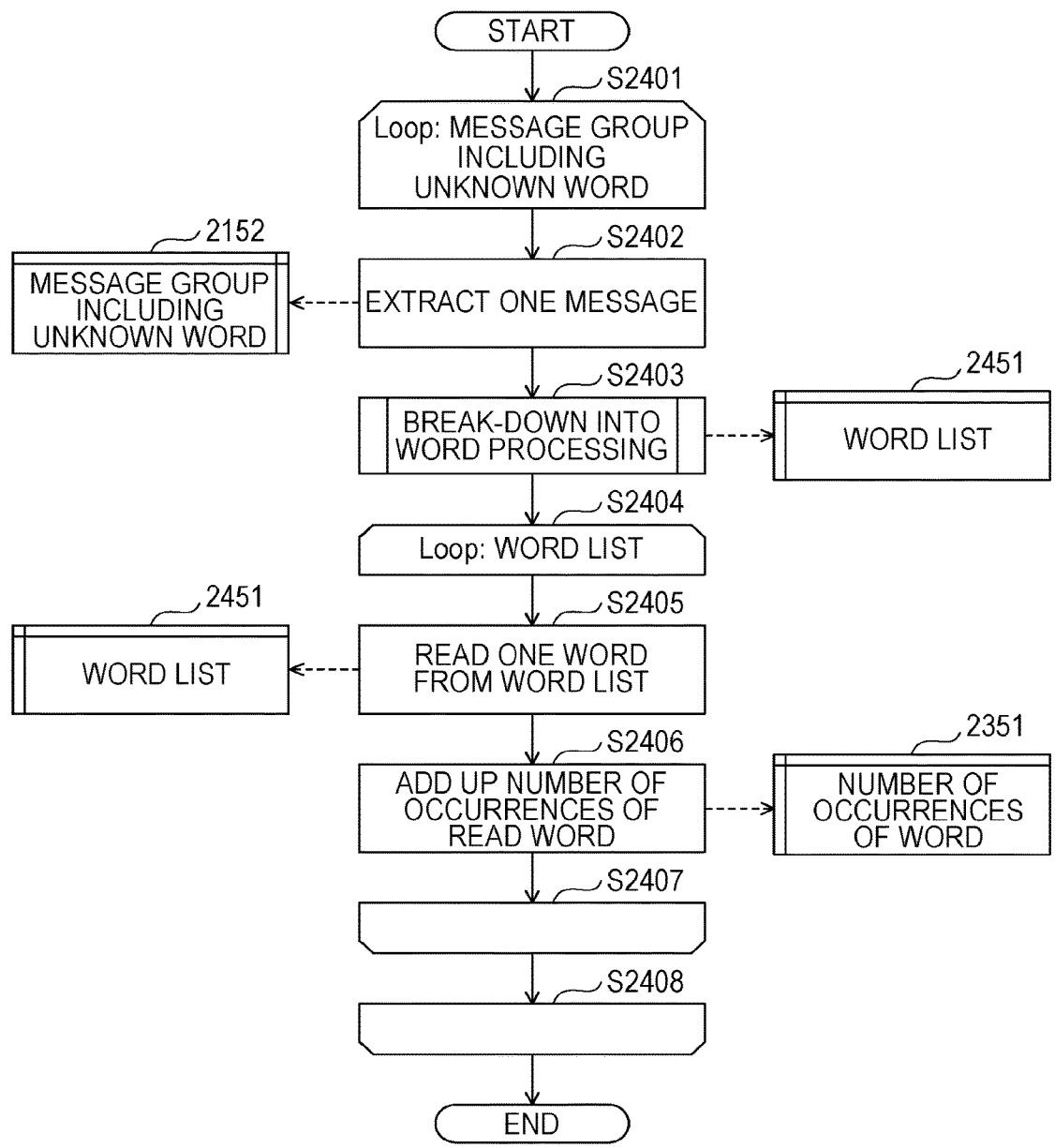
FIG. 24 is a diagram illustrating an example of an operational flowchart for number of occurrences of word calculation processing, according to an embodiment.

FIG. 24 is a flowchart illustrating an example of number of occurrences of word calculation processing. The number of occurrences of word calculation processing is processing that is called from step S2301. The message distribution device 101 repeats the processing in steps S2401 to S2408 for each of messages included in the message group 2152 including an unknown word. As internal processing repeated for the processing in steps S2401 to S2408, the message distribution device 101 extracts one message from the message group 2152 including an unknown word (step S2402). The message distribution device 101 performs the break-down into word processing on the extracted message (step S2403), and obtains a word list 2451. Here, the message distribution device 101 causes the extracted message to be processed as the extracted one message in the processing in step S1601 in the break-down into word processing.

Next, the message distribution device 101 repeats the processing in steps S2404 to S2407 for each of words included in the word list 2451. As internal processing repeated for the processing in steps S2404 to S2407, the message distribution device 101 reads one word from the word list 2451 (step S2405). The message distribution device 101 then increment the number of occurrences of read word (step S2406). The message distribution device 101 stores a result of the increment in the number of occurrences of word 2351 that is the output result of the number of occurrences of word calculation processing.

When repeating processing in steps S2404 to S2407 is exited and repeating processing in steps S2401 to S2408 is exited, the message distribution device 101 completes the number of occurrences of word calculation processing.

Figure 25:
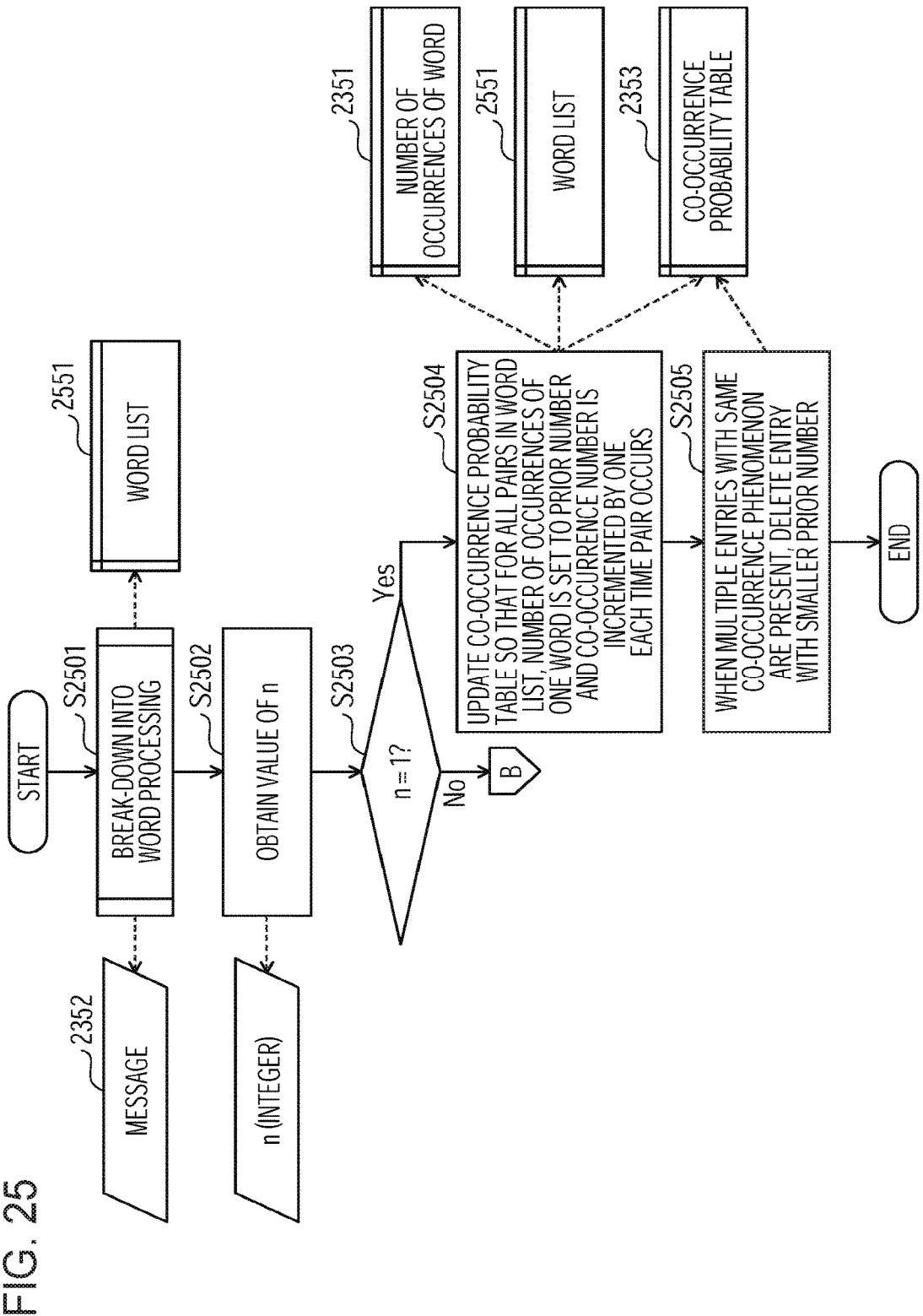
FIG. 25 is a diagram illustrating an example of an operational flowchart for co-occurrence phenomenon extraction processing, according to an embodiment.
Figure 26:
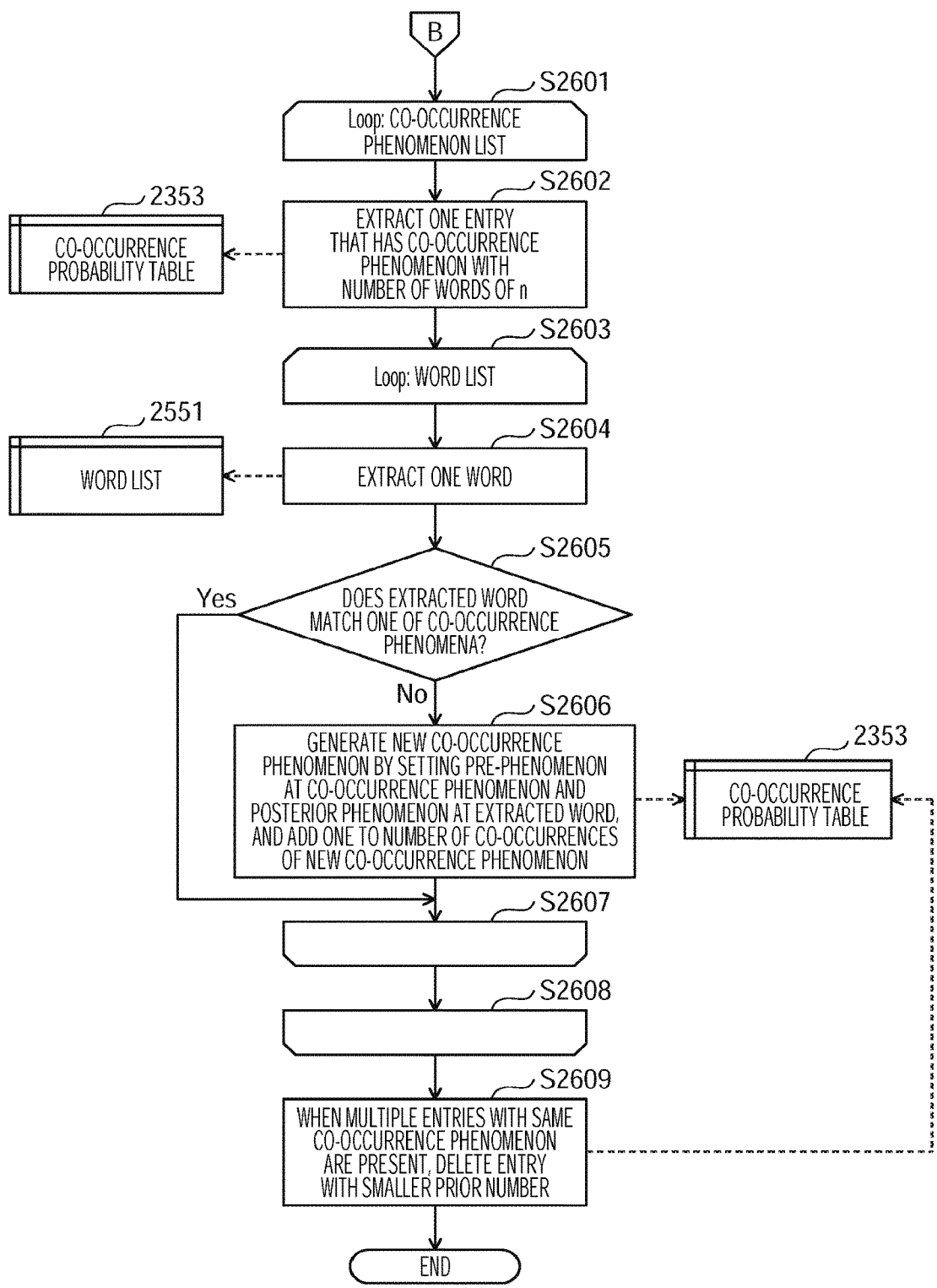
FIG. 26 is a diagram illustrating an example of an operational flowchart for co-occurrence phenomenon extraction processing, according to an embodiment.

FIG. 25 is a flowchart (part 1) illustrating an example of co-occurrence phenomenon extraction processing. FIG. 26 is a flowchart (part 2) illustrating an example of co-occurrence phenomenon extraction processing. The co-occurrence phenomenon extraction processing is processing that is called in step S2305.

The message distribution device 101 performs the break-down into word processing on the message 2352 (step S2501), and obtains a word list 2551. In the processing in step S1601 in the break-down into word processing, the message distribution device 101 processes the message 2352 as one extracted message. Next, the message distribution device 101 obtains the value of n which is used in the repeating processing in steps S2302 to S2310 (step S2502). The message distribution device 101 stores the obtained value of n in the RAM 303 or the like.

The message distribution device 101 then determines whether or not n is one (step S2503). When n is one (Yes in step S2503), for each of all pairs of words in the word list 2551, the message distribution device 101 sets a prior number at the number of occurrences of word 2351 of one word in the each pair, and updates the co-occurrence probability table 2353 so that each time a pair occurs, the number of co-occurrences is incremented by one (step S2504). Next, when multiple entries with the same co-occurrence phenomenon are present, the message distribution device 101 deletes an entry with a smaller prior number (step S2505). After the completion of the processing in step S2505, the message distribution device 101 completes the co-occurrence phenomenon extraction processing.

When n is not one (No in step S2503), in other words, when n is two or greater, the message distribution device 101 repeats the processing in steps S2601 to S2608 for each co-occurrence in the co-occurrence probability table 2353. As internal processing repeated for the processing in steps S2601 to S2608, the message distribution device 101 extracts one entry having a co-occurrence phenomenon with the number of words of n from the co-occurrence probability table 2353 (step S2602). The message distribution device 101 then repeats the processing in steps S2603 to S2607 for each of words included in the word list 2551. As internal processing repeated for the processing in steps S2603 to S2607, the message distribution device 101 extracts one word from the word list 2551 (step S2604). The message distribution device 101 determines whether or not the extracted word matches one of the co-occurrence phenomena (step S2605).

When the extracted word does not match any of the co-occurrence phenomena (No in step S2605), the message distribution device 101 generates new co-occurrence phenomenon by setting prior phenomenon at target co-occurrence phenomenon in the processing in steps S2601 to S2608 and setting posterior phenomenon at the extracted word, and increments the number of co-occurrences of a new co-occurrence phenomenon by one (step S2606). Here, the message distribution device 101 writes the incremented number of co-occurrences of the new co-occurrence phenomenon to the co-occurrence probability table 2353.

After the completion of the processing in step S2606, when the extracted word matches one of the co-occurrence phenomena (Yes in step S2605), the message distribution device 101 determines to continue to repeat the processing in steps S2603 to S2607. When repeating processing in steps S2603 to S2607 is exited and repeating processing in steps S2601 to S2608 is exited, the message distribution device 101 deletes an entry with a smaller prior number when multiple entries with the same co-occurrence phenomenon are present (step S2609). After the completion of the processing in step S2609, the message distribution device 101 completes the co-occurrence phenomenon extraction processing.

Next, an example of stored data in the co-occurrence probability table 2353 for n=1, 2 will be described with reference to FIG. 27.

Figure 27:
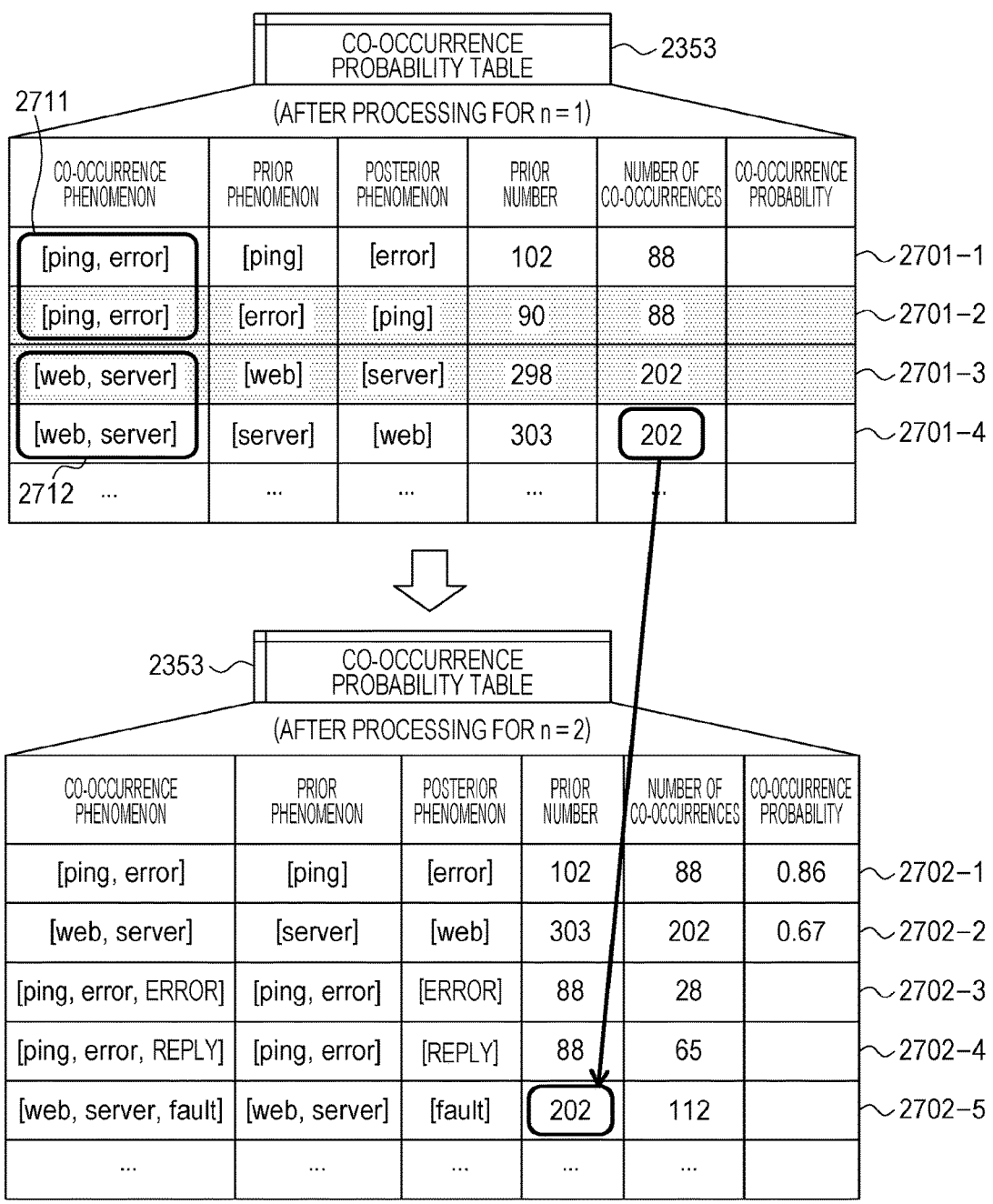
FIG. 27 is a diagram illustrating an example of stored data in a co-occurrence probability table at the time of co-occurrence phenomenon extraction processing, according to an embodiment.

FIG. 27 is an explanatory diagram illustrating an example of stored data in the co-occurrence probability table 2353 at the time of co-occurrence phenomenon extraction processing. The co-occurrence probability table 2353 illustrated in the upper part of FIG. 27 indicates a state after the processing for n=1, and the co-occurrence probability table 2353 illustrated in the lower part of FIG. 27 indicates a state after the processing for n=2.

The co-occurrence probability table 2353 includes fields called co-occurrence phenomenon, prior phenomenon, posterior phenomenon, prior number, the number of co-occurrences, and co-occurrence probability. The co-occurrence phenomenon field stores a combination of words for a co-occurrence phenomenon. The prior phenomenon field stores a prior word or a combination of prior words in a combination of words for a co-occurrence phenomenon. The posterior phenomenon field stores a posterior word in a combination of words for a co-occurrence phenomenon. The prior number field stores the number of occurrences of a prior phenomenon. The number of co-occurrences field stores the number of co-occurrences of prior phenomenon and posterior phenomenon. The co-occurrence probability field stores a probability that when prior phenomenon occurs, posterior phenomenon also occurs. Specifically, the co-occurrence probability field stores (the number of co-occurrences/prior number). It is to be noted that the co-occurrence probability fields of the entries 2701-1 to 4 are blank. This is because the co-occurrence probabilities of the entries 2701-1 to 4 are values to be calculated by the co-occurrence probability calculation processing, and thus are blank at the completion time of the co-occurrence phenomenon extraction processing.

The co-occurrence probability table 2353 for n=1 illustrated in the upper part of FIG. 27 has entries 2701-1 to 4. The entries 2701-1, 2 has the same co-occurrence phenomenon as indicated by a thick frame 2711, and the entries 2701-3, 4 has the same co-occurrence phenomenon as indicated by a thick frame 2712. Thus, the message distribution device 101 deletes the entries 2701-2, 3 with a smaller prior number by the processing in step S2505. In the co-occurrence probability table 2353 illustrated in the upper part of FIG. 27, the entries 2701-2, 3 to be deleted are shaded.

The co-occurrence probability table 2353 for n=2 illustrated in the lower part of FIG. 27 has entries 2702-1 to 5. The entries 2702-1, 2 are entries obtained by storing a co-occurrence probability in each co-occurrence probability field of the entries 2701-1, 4. In contrast, the entries 2702-3 to 5 are the entries that are added for n=2.

For instance, it is assumed that the entry extracted in step S2602 is the entry 2702-2, that is, the entry 2701-4, and the extracted word is [FAULT]. In this case, the message distribution device 101 adds, to the co-occurrence probability table 2353, an entry having a co-occurrence phenomenon of [WEB, SERVER, FAULT], prior phenomenon of [WEB, SERVER], and posterior phenomenon of [FAULT]. In addition, the message distribution device 101 registers 202 as the number of co-occurrences in the entry 2701-4, in the prior number in the added entry. Similarly to the case of n=1, the message distribution device 101 performs processing of actually counting the number of co-occurrences in the added entry.

Figure 28:
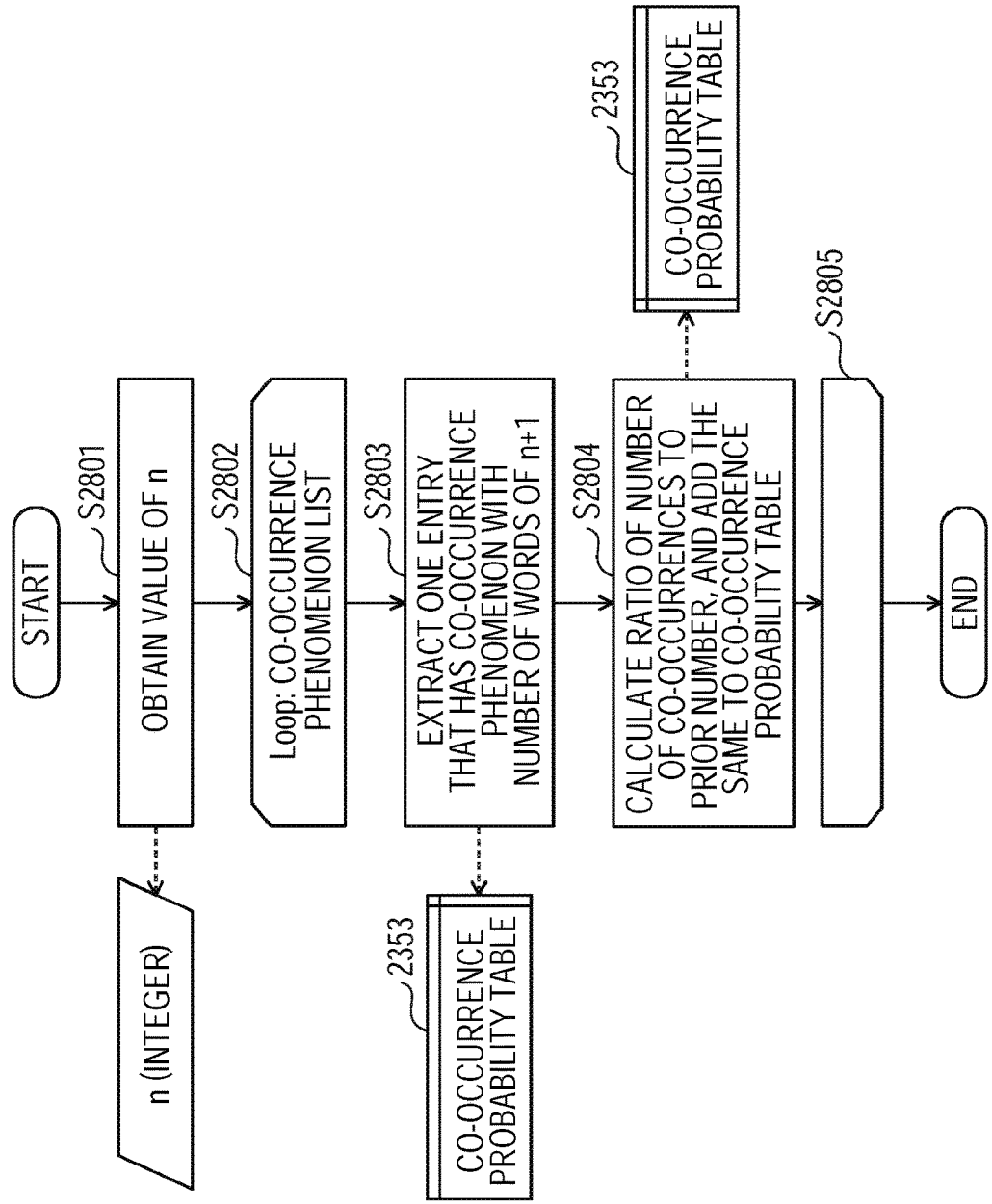
FIG. 28 is a diagram illustrating an example of an operational flowchart for co-occurrence probability calculation processing, according to an embodiment.

FIG. 28 is a flowchart illustrating an example of co-occurrence probability calculation processing. The co-occurrence probability calculation processing is processing that is called from step S2307. The message distribution device 101 obtains the value of n used in the processing in steps S2302 to S2310 (step S2801). The message distribution device 101 stores the obtained value of n in the RAM 303 of the like.

Next, the message distribution device 101 repeats the processing in steps S2802 to S2805 for each co-occurrence phenomenon in the co-occurrence probability table 2353. As internal processing repeated for the processing in steps S2802 to S2805, the message distribution device 101 extracts one entry having a co-occurrence phenomenon with the number of words of (n+1), from the co-occurrence probability table 2353 (step S2803). The message distribution device 101 calculates a ratio of the number of co-occurrences to the prior number, and adds the value obtained by the calculation to the co-occurrence probability table 2353 as a co-occurrence probability (step S2804).

When repeating processing in steps S2802 to S2805 is exited, the message distribution device 101 completes the co-occurrence probability calculation processing.

FIG. 29 is an explanatory table illustrating an example of stored data in the co-occurrence probability table 2353 at the time of co-occurrence probability calculation processing. The co-occurrence probability table 2353 illustrated in FIG. 29 indicates a state at the completion time of the co-occurrence probability calculation processing for n=2. The co-occurrence probability table 2353 illustrated in FIG. 29 has entries 2901-1 to 5. The entries 2901-1, 2 are in the same state as the entries 2702-1, 2. For the entries 2901-3 to 5, the message distribution device 101 calculates the co-occurrence probability of each of the entries 2901-3 to 5, and adds the value obtained by the calculation to each of the entries 2901-3 to 5. For instance, for the entry 2901-3, the message distribution device 101 calculates 28/88=approximately 0.32.

Figure 30:
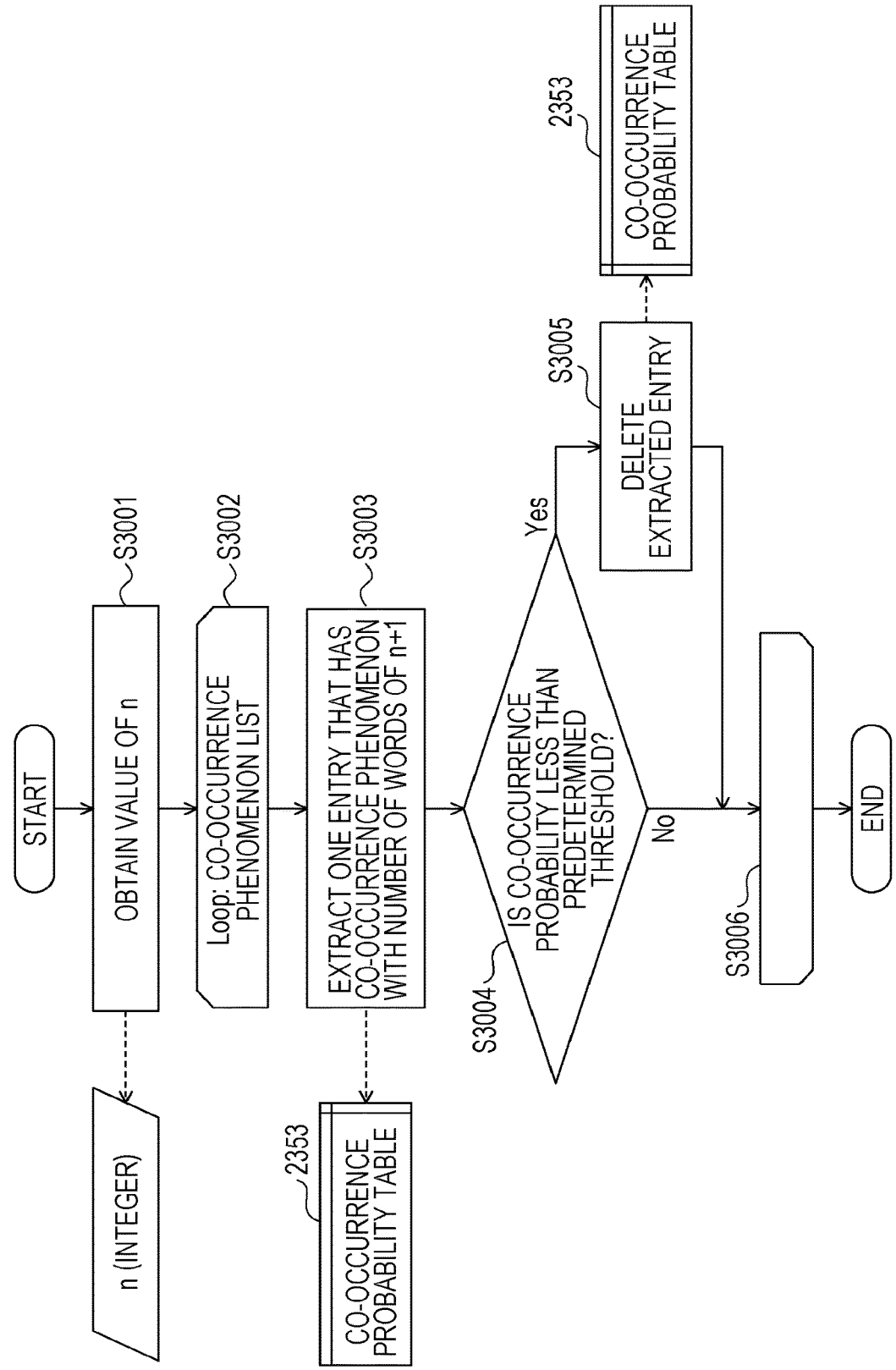
FIG. 30 is a diagram illustrating an example of an operational flowchart for context candidate extraction processing, according to an embodiment.

FIG. 30 is a flowchart illustrating an example of context candidate extraction processing. The context candidate extraction processing is processing that is called from step S2308. The message distribution device 101 obtains the value of n used in the processing in steps S2302 to S2310 (step S3001). The message distribution device 101 stores the obtained value of n in the RAM 303 or the like.

Next, the message distribution device 101 repeats the processing in steps S3002 to S3006 for each co-occurrence in the co-occurrence probability table 2353. As internal processing repeated for the processing in steps S3002 to S3006, the message distribution device 101 extracts one entry having a co-occurrence phenomenon with the number of words of (n+1) from the co-occurrence probability table 2353 (step S3003). The message distribution device 101 then determines whether or not the co-occurrence probability in the extracted entry is less than a predetermined threshold which has been determined in advance by the administrator or the like of the message distribution device 101 (step S3004).

When the co-occurrence probability in the extracted entry is less than a predetermined threshold (Yes in step S3004), the message distribution device 101 deletes the extracted entry from the co-occurrence probability table 2353 (step S3005). After the completion of the processing in step S3005, or when the co-occurrence probability in the extracted entry is a predetermined threshold or greater (No in step S3004), the message distribution device 101 determines whether or not repeating of the processing in steps S3002 to S3006 is exited. When repeating processing in steps S3002 to S3006 is exited, the message distribution device 101 completes the context candidate extraction processing. An entry which has not been deleted because the processing in step S3005 has not been performed becomes a context candidate.

Figure 31:
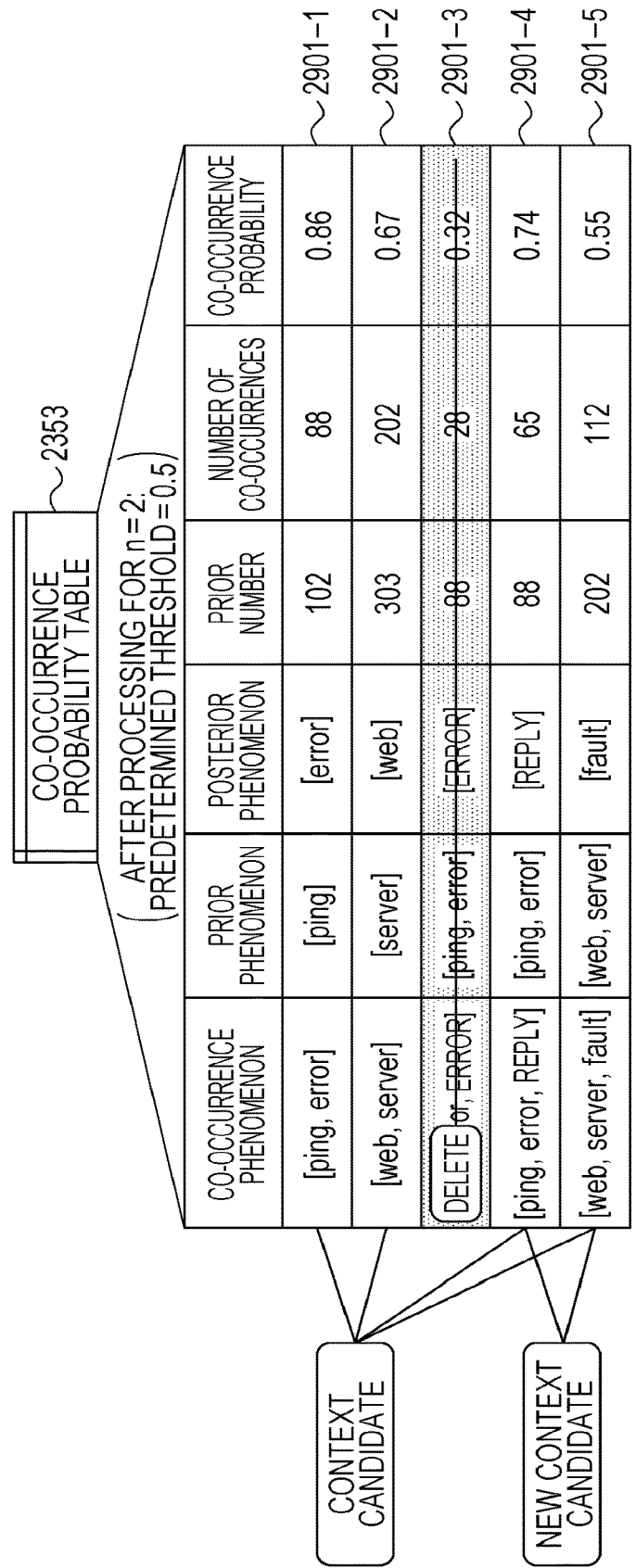
FIG. 31 is a diagram illustrating an example of stored data in a co-occurrence probability table at the time of context candidate extraction processing, according to an embodiment.

FIG. 31 is an explanatory table illustrating an example of stored data in the co-occurrence probability table 2353 at the time of context candidate extraction processing. The co-occurrence probability table 2353 illustrated in FIG. 31 indicates a state at the completion time of the context candidate extraction processing for n=2. The co-occurrence probability table 2353 illustrated in FIG. 31 is in the same state as the co-occurrence probability table 2353 illustrated in FIG. 29, and has entries 2901-1 to 5.

In FIG. 31, it is assumed that a predetermined threshold in step S3004 is 0.5. In this case, the message distribution device 101 deletes the entry 2901-3 because the co-occurrence probability in the entry 2901-3 is less than 0.5. Also, the context candidates are the entries 2901-1, 2, 4, 5, and new context candidates for n=2 are the entries 2901-4, 5. Thus, two new context candidates are present in this case, and the message distribution device 101 determines in the processing in step S2309 that a new context candidate is present.

Figure 32:
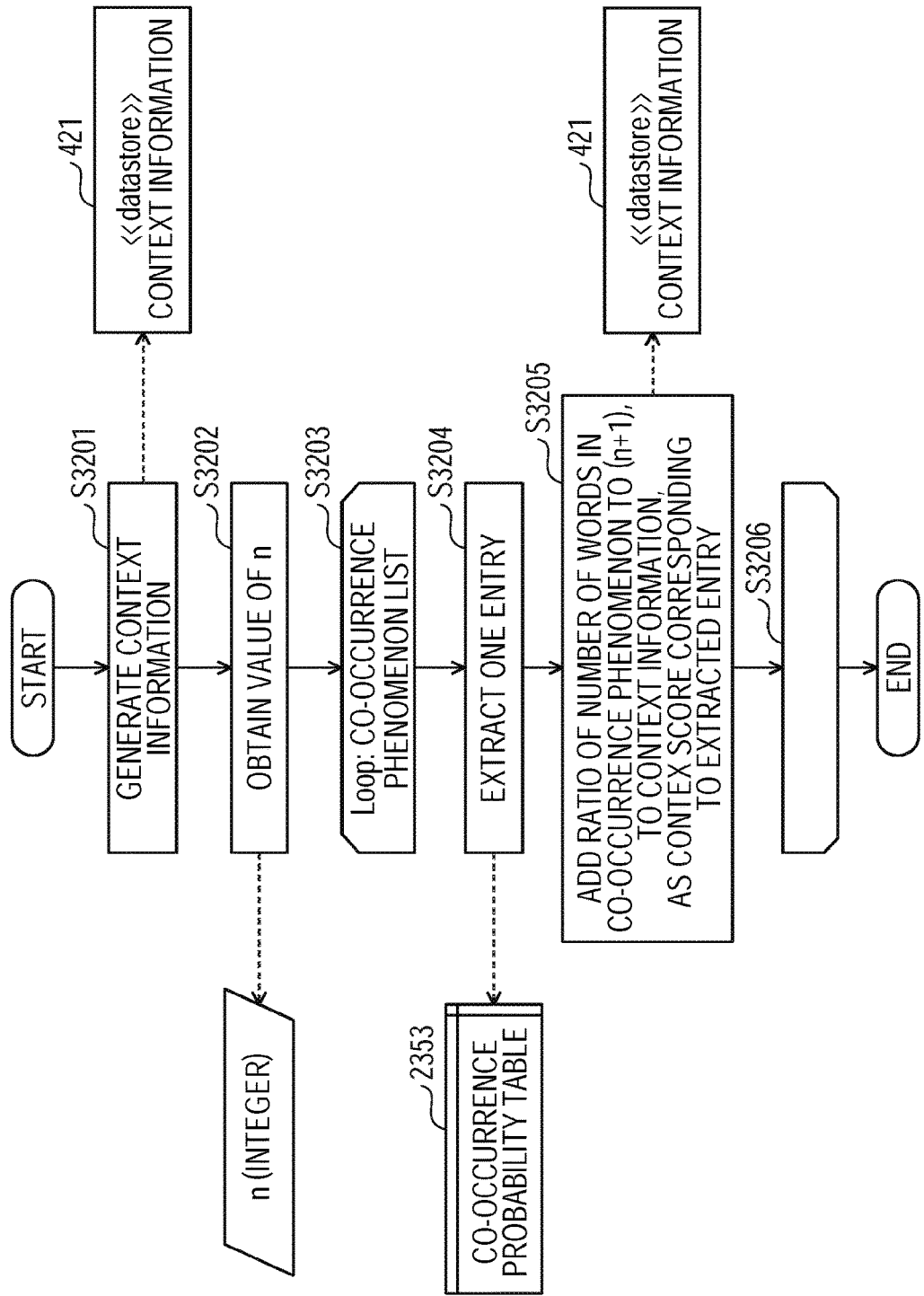
FIG. 32 is a diagram illustrating an example of an operational flowchart for context candidate score calculation processing, according to an embodiment.

FIG. 32 is a flowchart illustrating an example of context candidate score calculation processing. The context candidate score calculation processing is processing that is called from step S2311. The message distribution device 101 generates the context information 421 (step S3201). A specific method of generating the context information 421 will be described in FIG. 33. Next, the message distribution device 101 obtains the value of n used in the processing in steps S2302 to S2310 (step S3202). The message distribution device 101 stores the obtained value of n in the RAM 303 or the like.

Next, the message distribution device 101 repeats the processing in steps S3203 to S3206 for each co-occurrence in the co-occurrence probability table 2353. As internal processing repeated for the processing in steps S3203 to S3206, the message distribution device 101 extracts one entry having a co-occurrence phenomenon with the number of words of (n+1) from the co-occurrence probability table 2353 (step S3204). For the extracted entry, the message distribution device 101 adds, as a context score, a ratio of the number of words in the co-occurrence phenomenon to (n+1), to the context information 421 (step S3205).

When repeating processing in steps S3203 to S3206 is exited, the message distribution device 101 completes the context candidate score calculation processing.

Figure 33:
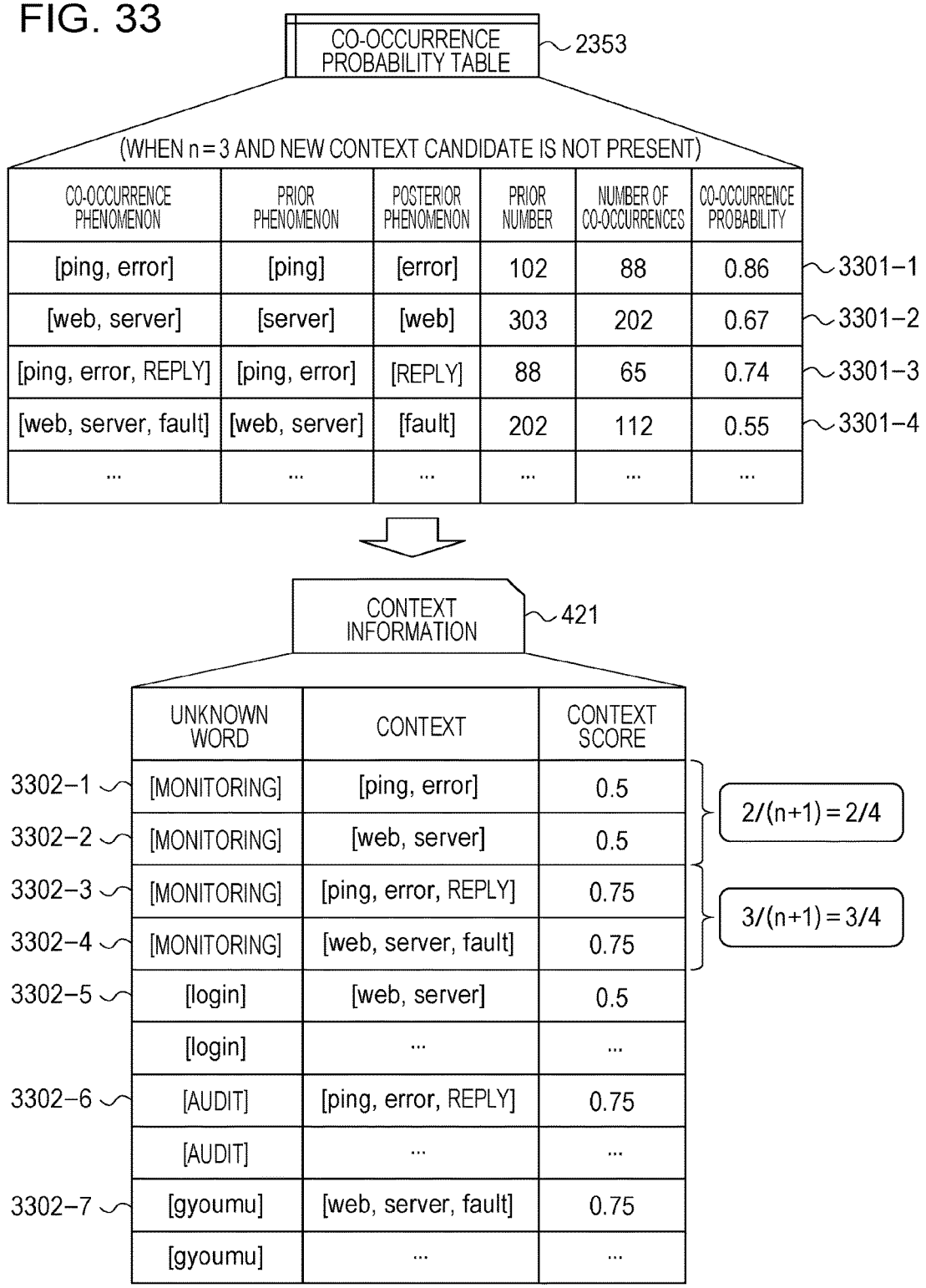
FIG. 33 is a diagram illustrating an example of generation of context information at the time of context candidate score calculation processing, according to an embodiment.

FIG. 33 is an explanatory diagram illustrating an example of generation of the context information 421 at the time of context candidate score calculation processing. The co-occurrence probability table 2353 illustrated in FIG. 33 indicates a state of the co-occurrence probability table 2353 at the time of the context candidate score calculation processing. The co-occurrence probability table 2353 illustrated in FIG. 33 has entries 3301-1 to 4. The entries 3301-1 to 4 correspond to the entries 2901-1, 2, 4, 5, respectively. Also, the context information 421 illustrated in FIG. 33 has entries 3302-1 to 7. FIG. 33 illustrates the case where when n=3 is used in the processing in steps S2302 to S2310, no new context candidate is present. In FIG. 33, an example of generation of the entries 3302-1 to 7 will be described.

In step S3201, the message distribution device 101 adds, to the context information 421, an entry in which the unknown word field is set at the unknown word used in the processing in steps S2103 to S2205 and the context field is set at the co-occurrence phenomenon in the co-occurrence probability table 2353. It is assumed that the co-occurrence probability table 2353 illustrated in FIG. 33 is generated for an unknown word [MONITORING]. In this case, the message distribution device 101 adds the entries 3302-1 to 4 to the context information 421, based on the unknown word [MONITORING] and the entries 3301-1 to 4. Similarly, the message distribution device 101 adds the entry 3302-5 to the context information 421, based on an unknown word [LOGIN] and the co-occurrence probability table 2353 generated for the unknown word [LOGIN]. Also, the message distribution device 101 processes unknown words

[AUDIT], [GYOUMU] similarly to the unknown word [LOGIN], and generates the entries 3302-6, 7.

Also, in step S3205, the message distribution device 101 calculates a ratio of the number of words to (n+1). For instance, in the entry 3301-1, the co-occurrence phenomenon is [PING, ERROR], and thus the number of words in the co-occurrence phenomenon is 2. Since n=3, the message distribution device 101 calculates the context score as 2/(n+1)=2/4=0.5. The message distribution device 101 stores 0.5 in the context score field of the entry 3302-1 corresponding to the entry 3301-1.

Figure 34:
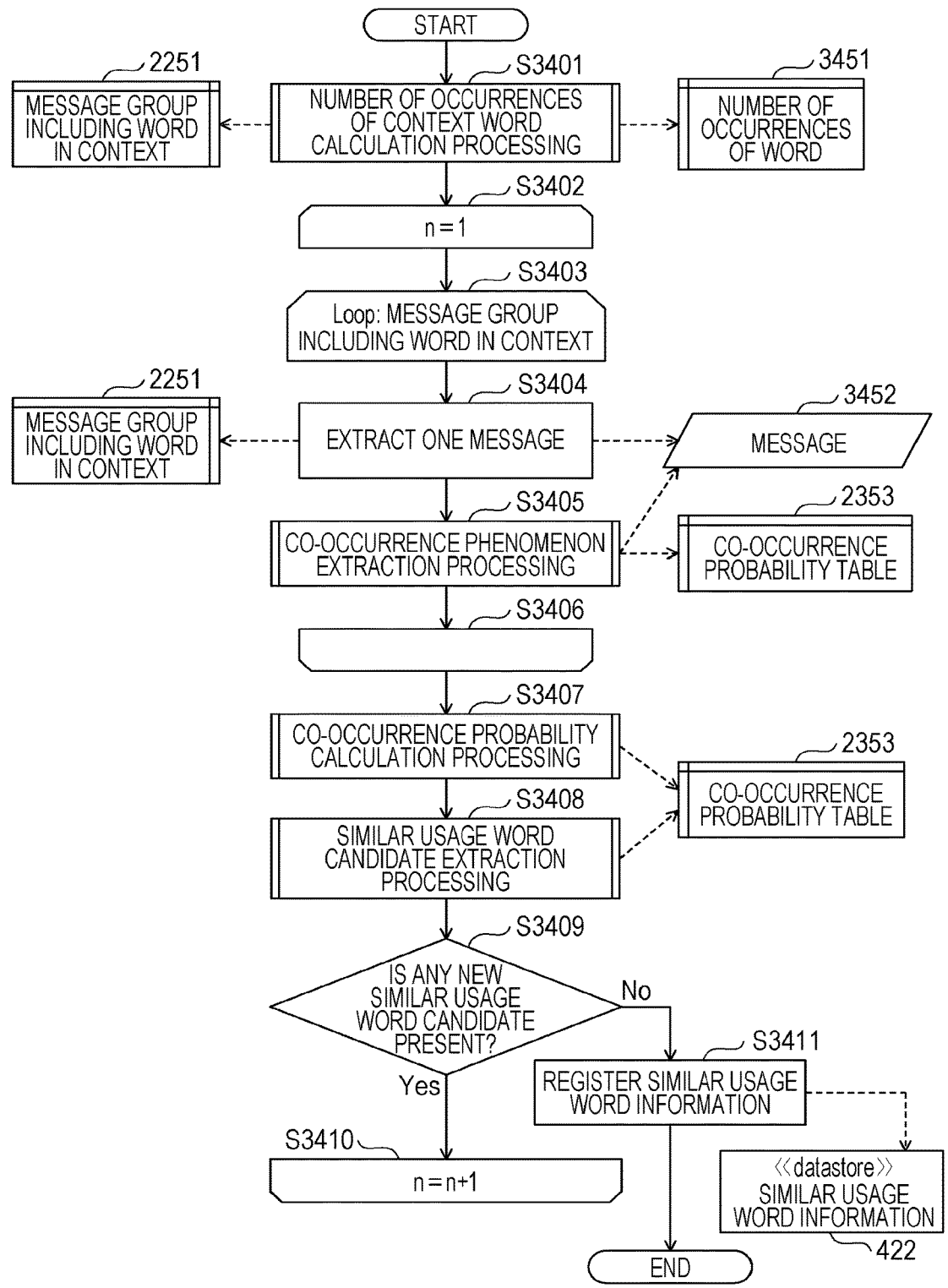
FIG. 34 is a diagram illustrating an example of an operational flowchart for high co-occurrence probability word group extraction processing for a context word, according to an embodiment.

FIG. 34 is a flowchart illustrating an example of high co-occurrence probability word group extraction processing for a context word. The high co-occurrence probability word group extraction processing for a context word is processing that is called from step S2203.

The message distribution device 101 performs number of occurrences of context word calculation processing on the message group 2251 including a context word (step S3401), and obtains the number of occurrences of word 3451. Here, the number of occurrences of context word calculation processing is similar to the number of occurrences of word calculation processing illustrated in FIG. 24 in which the message group 2152 including an unknown word is substituted by the message group 2251 including a context word, and description and illustration thereof are omitted.

Next, the message distribution device 101 sets the initial value of n at 1, sets the increment value at 1, and repeats the processing in steps S3402 to S3410. As internal processing repeated for the processing in steps S3402 to S3410, the message distribution device 101 repeats the processing in steps S3403 to S3406 for each of messages included in the message group 2251 including a context word. As internal processing repeated for the processing in steps S3403 to S3406, the message distribution device 101 extracts one message from the message group 2251 including a context word (step S3404). The message distribution device 101 stores the extracted message in the RAM 303 or the like as a message 3452.

Next, message distribution device 101 performs the co-occurrence phenomenon extraction processing on the message 3452 (step S3405), and updates the co-occurrence probability table 2353. Here, the co-occurrence phenomenon extraction processing is similar to the processing described in FIG. 25, FIG. 26, where, as the value of n obtained in step S2502, the message distribution device 101 obtains the value of n used in the repeating processing in steps S3402 to S3410.

When repeating processing in steps S3403 to S3406 is exited, the message distribution device 101 performs the co-occurrence probability calculation processing (step S3407). The co-occurrence probability calculation processing is similar to the processing described in FIG. 28, where, as the value of n obtained in step S2801, the message distribution device 101 obtains the value of n used in the repeating processing in steps S3402 to S3410. Also, in the co-occurrence probability calculation processing, the message distribution device 101 updates the co-occurrence probability table 2353.

The message distribution device 101 performs similar usage word candidate extraction processing (step S3408). The similar usage word candidate extraction processing is substantially the same as the context candidate processing, and thus description and illustration thereof are omitted. As a different point, in the context candidate processing, an entry which has not been deleted because the processing in step S3005 has not been performed becomes a context candidate, however, in the similar usage word candidate extraction processing, an entry which has not been deleted because processing corresponding to step S3005 has not been performed becomes a similar usage word candidate. Also, in the similar usage word candidate extraction processing, the message distribution device 101 updates the co-occurrence probability table 2353.

Next, the message distribution device 101 determines whether or not a new similar usage word candidate is present (step S3409). Here, a new similar usage word candidate is the entry which is added to the co-occurrence probability table 2353 by the nth time processing in step S3405, and which has not been deleted by the nth time processing in step S3408.

When a new similar usage word candidate is present (Yes in step S3409), the message distribution device 101 increments n by one, and continues to repeat the processing in steps S3402 to S3410. On the other hand, when a new similar usage word candidate is not present (No in step S3409), the message distribution device 101 registers the similar usage word information 422 (step S3411). A specific example of registration of the similar usage word information 422 will be described in FIG. 35. After the completion of the processing in step S3411, the message distribution device 101 completes the high co-occurrence probability word group extraction processing for a context word.

Figure 35:
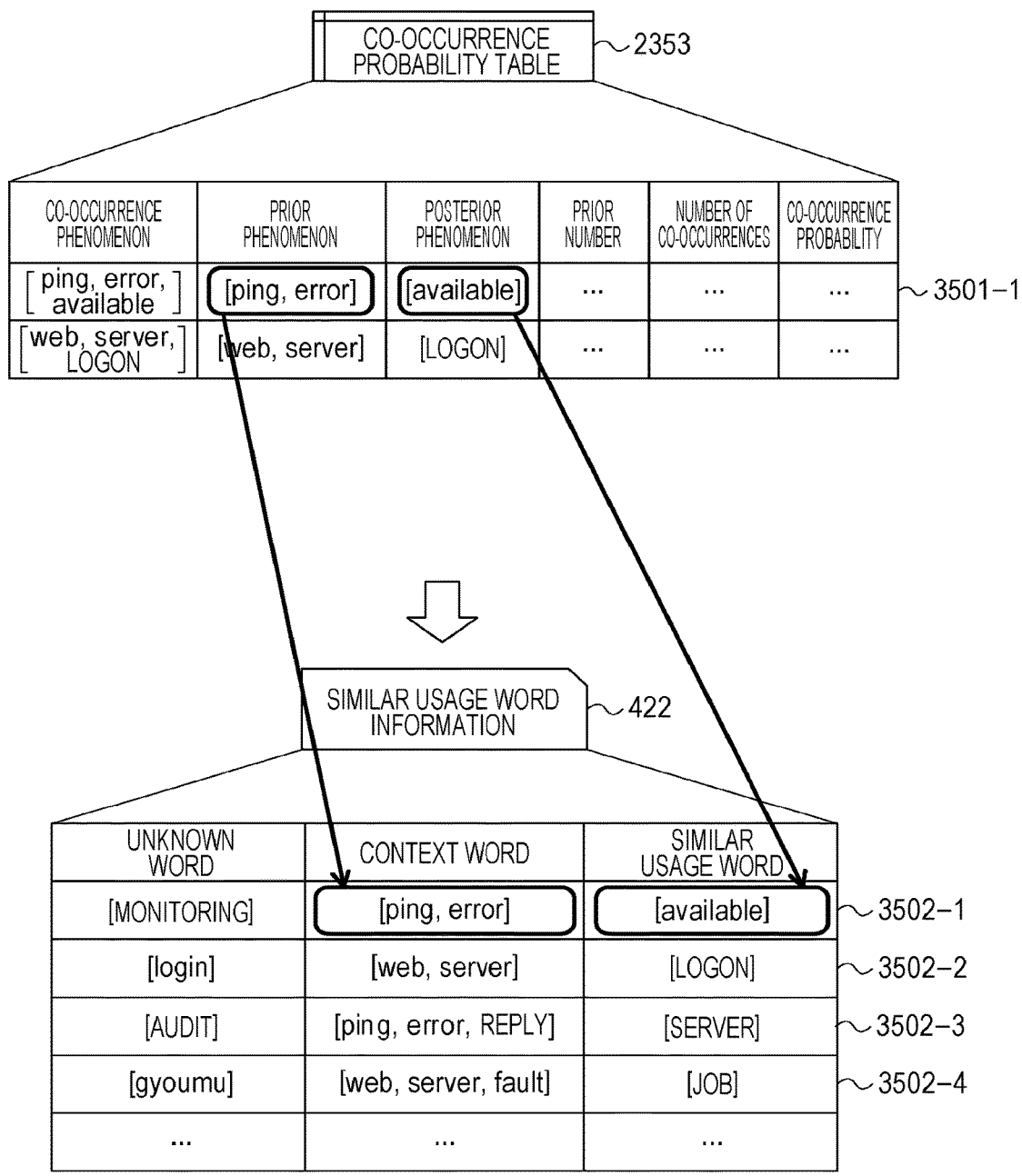
FIG. 35 is a diagram illustrating an example of registration of similar usage word information, according to an embodiment.

FIG. 35 is an explanatory diagram illustrating an example of registration of the similar usage word information 422. In step S3411, the message distribution device 101 adds, to the similar usage word information 422, an entry in which the value in the unknown word field is set at the unknown word used in the processing in steps S2103 to S2205. The message distribution device 101 then stores the values of prior phenomenon and posterior phenomenon included in the co-occurrence probability table 2353, in the context word field, and the similar usage word field, respectively, in the entry.

The co-occurrence probability table 2353 illustrated in FIG. 35 indicates an example of stored data in a state where the similar usage word candidate extraction processing is completed. The co-occurrence probability table 2353 illustrated in FIG. 35 has an entry 3501-1. It is assumed that the co-occurrence probability table 2353 illustrated in FIG. 35 is generated for an unknown word [MONITORING]. In this case, in step S3411, the message distribution device 101 adds the entry 3502-1 to the similar-usage word information 422, based on the unknown word [MONITORING] and the entry 3501-1. The message distribution device 101 processes unknown words [LOGIN], [AUDIT], [GYOUMU] in a manner similar to the unknown word [MONITORING], and generates the entries 3502-2 to 4.

Figure 36:
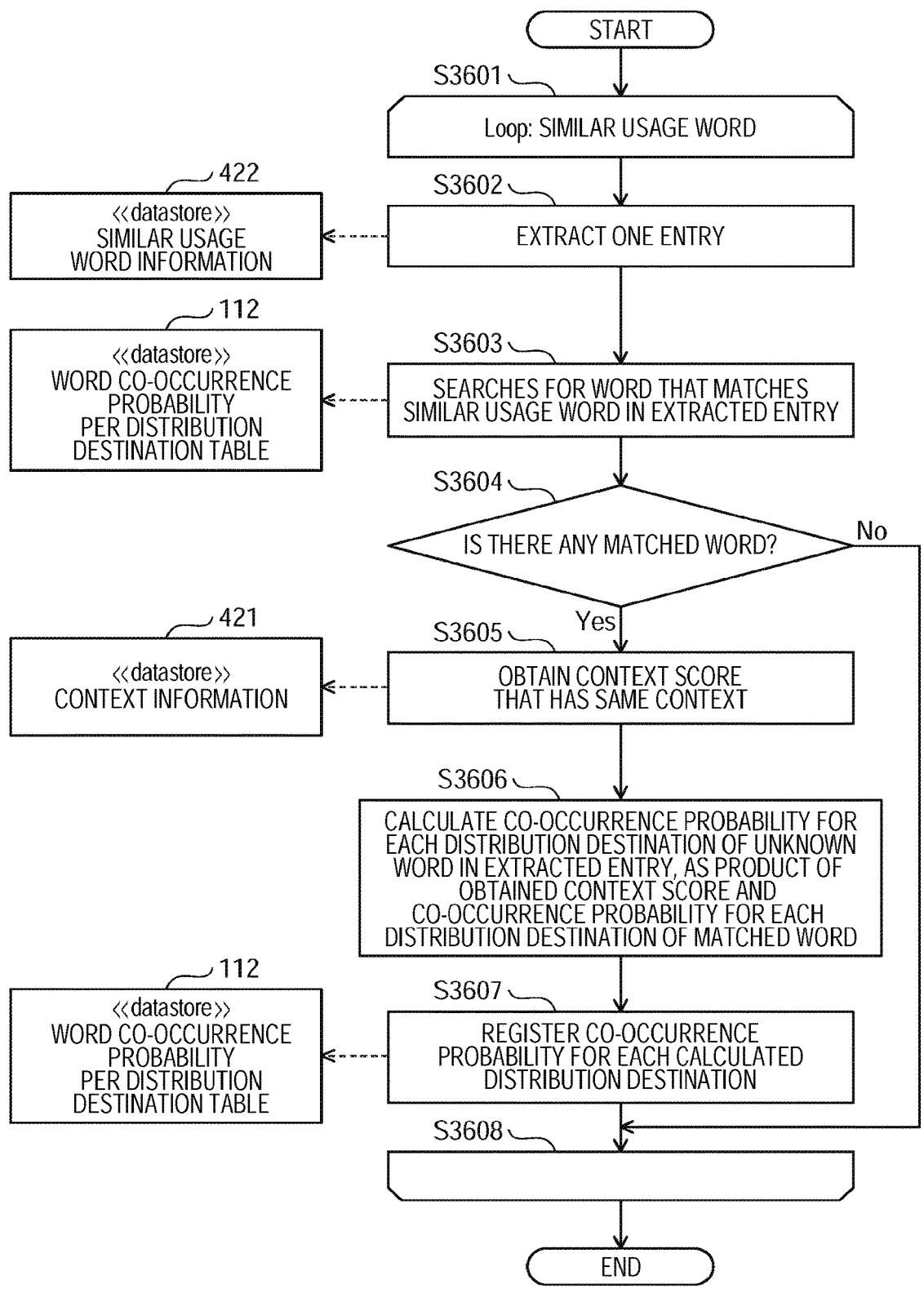
FIG. 36 is a diagram illustrating an example of an operational flowchart for word co-occurrence probability calculation processing per distribution destination for an unknown word, according to an embodiment.

FIG. 36 is a flowchart illustrating an example of word co-occurrence probability calculation processing per distribution destination for an unknown word. The word co-occurrence probability calculation processing per distribution destination for an unknown word is called from step S2206. The message distribution device 101 repeats the processing in steps S3601 to S3608 for each similar usage word included in the similar usage word information 422. As internal processing repeated for the processing in steps S3601 to S3608, the message distribution device 101 extracts one entry from the similar usage word information 422 (step S3602). Next, the message distribution device 101 searches the word field in the word co-occurrence probability per distribution destination table 112 for a word that matches the similar-usage word in the extracted entry (step S3603).

The message distribution device 101 determines whether or not a matched word is present (step S3604). When a matched word is present (Yes in step S3604), the message distribution device 101 obtains, from the context information 421, a context score belonging to an entry having the same unknown word as in the extracted entry and having the same context as the context information of the extracted entry (step S3605). The message distribution device 101 calculates a co-occurrence probability for each distribution destination of the unknown word in the extracted entry, as the product of the obtained context score and the co-occurrence probability for each distribution destination of the matched word in the word co-occurrence probability per distribution destination table 112 (step S3606). Next, the message distribution device 101 registers the calculated co-occurrence probability for each distribution destination in the word co-occurrence probability per distribution destination table 112 (step S3607). An example of registration of calculating a co-occurrence probability for each distribution destination and registering the co-occurrence probability in the word co-occurrence probability per distribution destination table 112 will be described in FIG. 37.

After the completion of the processing in step S3606, or when no matched word is present (No in step S3604), the message distribution device 101 determines whether or not the processing in steps S3601 to S3608 is exited. When the processing in steps S3601 to S3608 is exited, the message distribution device 101 completes the word co-occurrence probability calculation processing per distribution destination for an unknown word.

Figure 37:
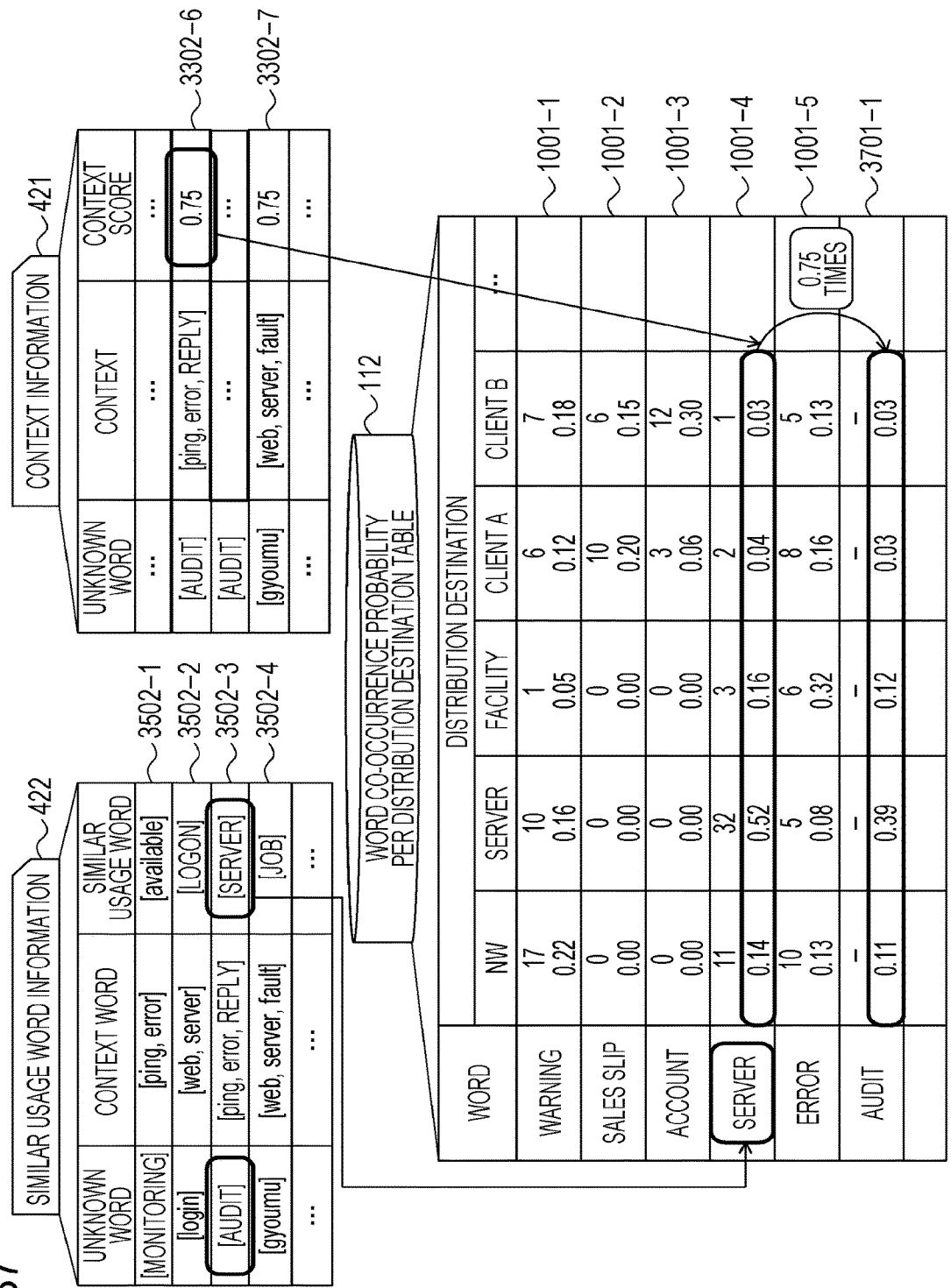
FIG. 37 is a diagram illustrating an example of calculation of co-occurrence probability for each distribution destination, and an example of writing data to the word co-occurrence probability per distribution destination table, according to an embodiment.

FIG. 37 is an explanatory diagram illustrating an example of calculation of co-occurrence probability for each distribution destination, and an example of writing data to the word co-occurrence probability per distribution destination table 112. The similar usage word information 422 illustrated in FIG. 37 is the same as the similar usage word information 422 illustrated in FIG. 35, and has entries 3502-1 to 4. Although the context information 421 illustrated in FIG. 37 is the same as the context information 421 illustrated in FIG. 33, the entries 3302-6, 7 are illustrated for the sake of convenience of drawing. The word co-occurrence probability per distribution destination table 112 illustrated in FIG. 37 has the entry 3701-1 added by the word co-occurrence probability calculation processing per distribution destination for an unknown word, in addition to the entries 1001-1 to 5 illustrated in FIG. 10. The entry 3701-1 will be described in FIG. 37.

In the processing in step S3603, the message distribution device 101 searches for a word that matches the similar-usage word of the extracted entry, from the word field in the word co-occurrence probability per distribution destination table 112. In the example of FIG. 37, the similar usage word [SERVER] in the entry 3502-3 matches the word [SERVER] in the entry 1001-4. Thus, the message distribution device 101 determines Yes in step S3604, and obtains 0.75 which is the context score of the entry 3302-6. Next, the message distribution device 101 calculates the product of 0.75 and the co-occurrence probability for each distribution destination of the entry 1001-4. The message distribution device 101 adds, to the word co-occurrence probability per distribution destination table 112, an entry 3701-1 in which each calculated value is set to the co-occurrence probability for each distribution destination of the word [AUDIT].

Here, the context information 421 may include multiple entries that have the same unknown word as the unknown word in the similar usage word information 422. In this case, the message distribution device 101 only have to obtain a larger context score out of the context scores in the multiple entries having the same unknown word.

Also, the context information 422 may include multiple entries that have the same unknown word. Thus, multiple similar usage words for an unknown word may be present, and the word co-occurrence probability per distribution destination table 112 may include entries that correspond to the multiple similar usage words, respectively. In this case, the message distribution device 101 only have to register, as a co-occurrence probability for a distribution destination of the unknown word, a larger one of product values, which are each obtained by multiplying a co-occurrence probability for the distribution destination of different one of the multiple similar usage words by a context score of the different one of the multiple similar usage words, in the word co-occurrence probability per distribution destination table 112.

For instance, in addition to the state illustrated in FIG. 37, it is assumed that the similar usage word information 422 includes an entry that has the similar usage word [ERROR] for the unknown word [AUDIT]. It is further assumed that two words are registered in the context field of the entry, and the corresponding context score in the context information 421 is 0.5. In this case, after the entry 3701-1 is registered, when the product of 0.5 and the co-occurrence probability for each distribution destination of the entry 1001-5 is larger than the co-occurrence probability for each distribution destination of the entry 3701-1, the message distribution device 101 may overwrite the co-occurrence probability of the entry 3701-1 with the product. For instance, the co-occurrence probability of [ERROR] for [FACILITY] is 0.32, and the product of 0.5 and 0.32 is 0.16, thus the message distribution device 101 updates the co-occurrence probability for [FACILITY] of the entry 3701-1 with 0.16. Thus, the message distribution device 101 is able to reflect a word having a closer relationship with an entry to be registered.

Figure 38:
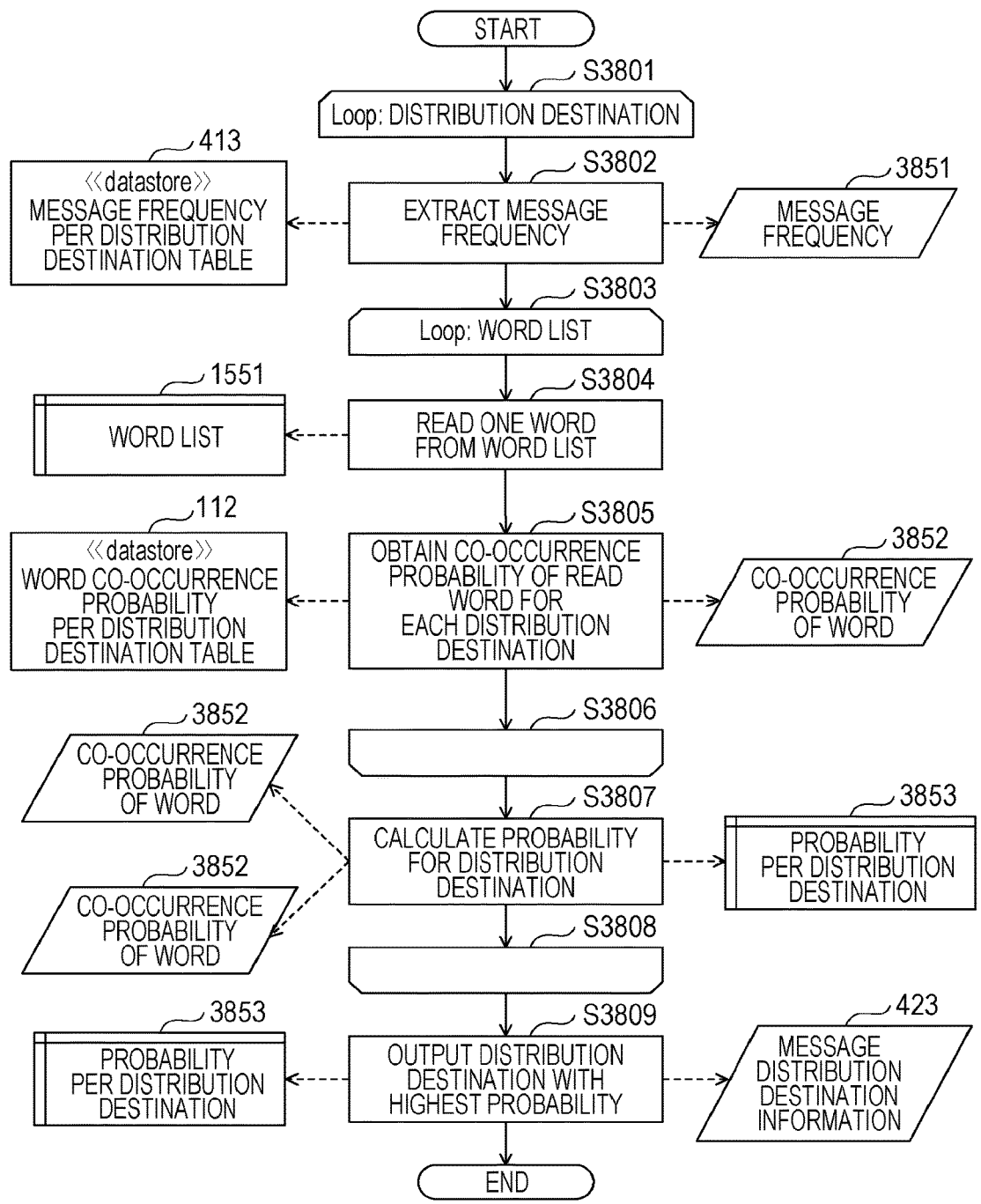
FIG. 38 is a diagram illustrating an example of an operational flowchart for Bayesian classification processing, according to an embodiment.

FIG. 38 is a flowchart illustrating an example of Bayesian classification processing. The Bayes classification processing is called from step S1503. The message distribution device 101 repeats the processing in steps S3801 to S3808 for each distribution destination. As internal processing repeated for the processing in steps S3801 to S3808, the message distribution device 101 extracts a message frequency corresponding to the current distribution destination from the message frequency per distribution destination table 413 (step S3802). The message distribution device 101 stores the extracted message frequency in the RAM 303 or the like as a message frequency 3851.

Next, the message distribution device 101 repeats the processing in steps S3803 to S3806 for each of words included in the word list 1551. As internal processing repeated for the processing in steps S3803 to S3806, the message distribution device 101 reads one word from the word list 1551 (step S3804). Next, the message distribution device 101 obtains the co-occurrence probability of the read word for each distribution destination, from the word co-occurrence probability per distribution destination table 112 (step S3805). The message distribution device 101 stores the obtained co-occurrence probability of the word in the RAM 303 or the like as a co-occurrence probability of word 3852.

When repeating processing in steps S3803 to S3806 is exited, the message distribution device 101 calculates a probability for each distribution destination from the co-occurrence probability of word 3852 by using Expression (1) (step S3807). The message distribution device 101 stores the calculated probability in a probability per distribution destination 3853 in the RAM 303 or the like.

When repeating processing in steps S3801 to S3808 is exited, the message distribution device 101 outputs a distribution destination with a highest probability in the probability per distribution destination 3853 as the message distribution destination information 423 (step S3809). After the completion of the processing in step S3809, the message distribution device 101 completes the Bayesian classification processing. Next, the effects of this embodiment will be described using FIG. 39.

Figure 39:
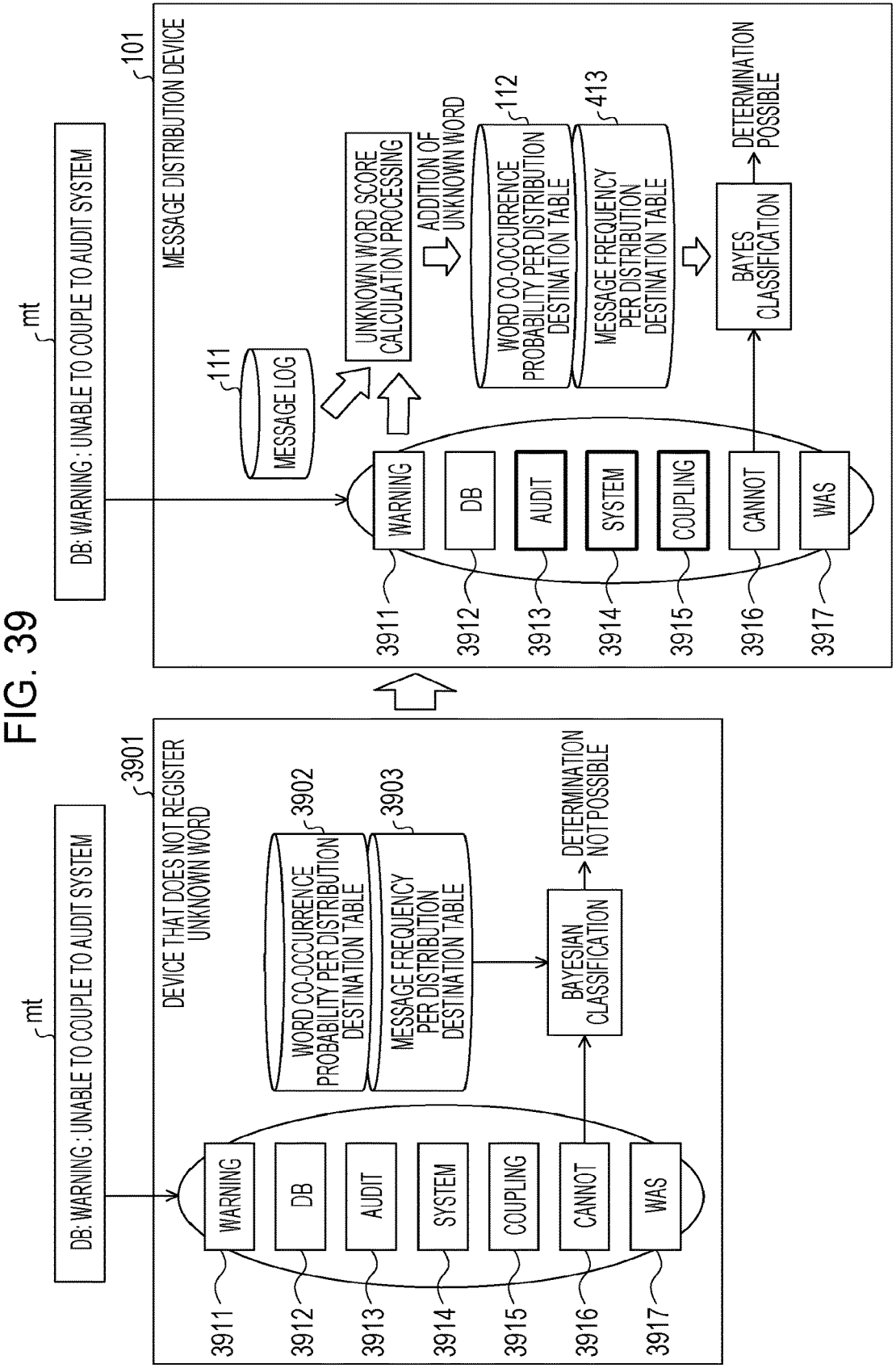
FIG. 39 is a diagram illustrating an example of effect, according to an embodiment.

FIG. 39 is an explanatory diagram illustrating an example of effect in this embodiment. A device 3901 illustrated on the left side of FIG. 39 has a word co-occurrence probability per distribution destination table 3902, and a message frequency per distribution destination table 3903. Here, the word co-occurrence probability per distribution destination table 3902 is a table that has stored data similar to the stored data in the word co-occurrence probability per distribution destination table 112. The message frequency per distribution destination table 3903 is a table that has stored data similar to the stored data in the message frequency per distribution destination table 413. The device 3901 does not register an unknown word in the word co-occurrence probability per distribution destination table 3902.

It is assumed that the device 3901 receives the message mt to be distributed, illustrated in FIG. 39. At this point, the device 3901 breaks downs the message mt to be distributed into words 3911 to 3917. In the example of FIG. 39, it is assumed that only the word 3911, [WARNING] is registered in the word co-occurrence probability per distribution destination table 3902. In this case, even if the device 3901 performs the Bayesian classification, it is not possible to determine a distribution destination of the message mt to be distributed because of a large number of unknown words.

In contrast, the message distribution device 101 illustrated on the right side of FIG. 39, when receiving the message mt to be distributed, refers to the message log 111, and performs the unknown word score calculation processing. In this manner, the message distribution device 101 registers the words 3913 to 3915, [AUDIT], [SYSTEM], [COUPLING] in the word co-occurrence probability per distribution destination table 112. Thus, even for a message including many unknown words, such as the message mt to be distributed, the message distribution device 101 may be able to determine a distribution destination of the message mt to be distributed, based on the scores of a greater amount of words.

As described above, the message distribution device 101 extracts a context word which is included, along with an unknown word, in the first message group, and registers a distribution destination of the unknown word, based on the distribution destination of a similar-usage word included, along with a context word, in the second message group. Consequently, even for a message which is not completely matched with one of training data, the message distribution device 101 may be able to determine an appropriate distribution destination, and it is possible to properly distribute a large amount of messages even with a small volume of the training data.

Also, the message distribution device 101 may calculate a co-occurrence probability for each distribution destination of an unknown word, based on the distribution destination of each message including the similar usage word and the context words in the second message group. Consequently, even when a similar-usage word is not registered in the word co-occurrence probability per distribution destination table 112, the message distribution device 101 may be able to calculate a co-occurrence probability for each distribution destination of an unknown word.

The message distribution device 101 may calculate a co-occurrence probability for each distribution destination of the unknown word by multiplying a co-occurrence probability for each distribution destination of a similar-usage word by a context score. Here, since the context score is between 0 and 1, and increases monotonically as the number of context words increases, a result of the calculation of the co-occurrence probability is higher when the number of context words is larger. Thus, when the number of context words is large and a similar-usage word is expected to be similar to the usage in the context words, the message distribution device 101 may use the co-occurrence probability of the similar-usage word as the co-occurrence probability of an unknown word.

Also, the message distribution device 101 may extract as a candidate combination of the context words, out of permutations of the words included in each message of the first message group, a permutation having a highest number of occurrences of the head word being included in the first message group. Next, as the co-occurrence probability of the words included in the permutation, the message distribution device 101 calculates a ratio of the number of occurrences of all the words of the permutation being included in the first message group, to the number of occurrences of the head word of the permutation being included in the first message group. When the calculated co-occurrence probability of the words included in permutation is a predetermined threshold or greater, the message distribution device 101 extracts the permutation as a combination of the context words. Thus, the message distribution device 101 may reduce a co-occurrence probability to be calculated. Therefore, the message distribution device 101 may increase the probability that a co-occurrence probability is less than a predetermined threshold, and thus a combination of context words is quickly detectable. In the flowchart, No in step S2309 is likely to be achieved by the message distribution device 101.

Also, the message distribution device 101 may determine a distribution destination of the message mt to be distributed by using the word co-occurrence probability per distribution destination table 112 in which the co-occurrence probability of each unknown word is registered. Thus, the message distribution device 101 may be able to determine a distribution destination of the message mt to be distributed, based on the scores of a greater amount of words.

It is to be noted that the message distribution method described in this embodiment may be implemented by executing a prepared program by a computer such as a personal computer or a workstation. The message distribution program is recorded on a computer readable recording medium such as a hard disk, a flexible disk, a compact disc-read only memory (CD-ROM), a digital versatile disk (DVD), and is read from the recording medium and executed by a computer. The message distribution program may be distributed via a network such as the Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory, computer-readable recording medium having stored therein a program for causing a computer to execute a process comprising:

obtaining co-occurrence probability information in which a first co-occurrence probability of each word of a plurality of words is stored in association with each of a plurality of distribution destinations, the first co-occurrence probability indicating a probability that each word is included in a message that has been distributed to each of the distribution destinations associated therewith;

upon occurrence of a message to be distributed to one of the plurality of distribution destinations, and with reference to the co-occurrence probability information extracting, from words included in the message to be distributed, unknown words that are not included in the plurality of words, and determining whether a first ratio, of a number of the unknown words to a number of the words, is equal to or greater than a predetermined ratio;

when the first ratio is smaller than the predetermined ratio, distributing the message to one distribution destination of the plurality of distribution destinations, the one distribution destination determined based on the co-occurrence probability information; and when the first ratio is equal to or greater than the predetermined ratio, updating the co-occurrence probability information by using the unknown words, and distributing the message to the one distribution destination, wherein the updating the co-occurrence probability information includes:

extracting first words which are included in all of a first group of messages each including an unknown word of the unknown words;

calculating the first co-occurrence probability of the unknown word for each distribution destination, based on the co-occurrence probability information regarding the plurality of distribution destinations to which a message including a second word, which is included in all of a second group of messages each including the first words and not including the unknown word, is to be distributed; and registering the calculated first co-occurrence probability of the unknown word for each distribution destination, in the co-occurrence probability information.

2. The non-transitory, computer-readable recording medium of claim 1, the process further comprising extracting the second word from the second group of messages, wherein the calculating includes, calculating, when the second word is included in the plurality of words, the first co-occurrence probability of the unknown word, based the first co-occurrence probability of the second word for each of the plurality of distribution destinations.

3. The non-transitory, computer-readable recording medium of claim 2, wherein the extracting the first words includes extracting a plurality of combinations of the first words, each combination of the first words having a second co-occurrence probability higher than or equal to a predetermined threshold, the second co-occurrence probability indicating a probability of co-occurrence of words of each combination being included in each of the first group of messages;

the extracting the second word includes extracting as the second word, for each of the extracted plurality of combinations of the first words, a word for which a third co-occurrence probability is higher than or equal to a predetermined threshold, the third co-occurrence probability indicating a probability of co-occurrence of the word and all the first words of the extracted each combination; and the calculating includes, with reference to the co-occurrence probability information, calculating the first co-occurrence probability of the unknown word for each distribution destination, based on the first co-occurrence probability of the second word for each distribution destination, a number of the first words included in each combination of the first words, and a number of the first words included in a combination that includes a maximum number of the first words among the plurality of combinations.

4. The non-transitory, computer-readable recording medium of claim 3, the process further comprising:

out of permutations of words included in each message of the first group of messages, extracting a permutation having a highest number of occurrences of a head word of the permutation being included in the first group of messages as a candidate for a combination of the first words;

as a fourth co-occurrence probability indicating a probability of co-occurrence of words being included in the extracted permutation, calculating a ratio of a number of occurrences of all words included in the permutation being included in the first group of messages, to a number of occurrences of the head word of the permutation being included in the first group of messages; and the extracting the first words includes extracting, as a combination of the first words, the extracted permutation when the calculated fourth co-occurrence probability is higher than or equal to a predetermined threshold.

5. The non-transitory, computer-readable recording medium of claim 1, the process further comprising:

with reference to the co-occurrence probability information, calculating, for each of the plurality of distribution destinations, a distribution probability of the message to be distributed to each distribution destination, the distribution probability indicating a probability that a distribution destination of the message to be distributed becomes the each distribution destination; and determining one of the plurality of distribution destinations having a highest value of the distribution probability to be the distribution destination of the message to be distributed.

6. An apparatus, comprising:

a memory; and a processor coupled to the memory and configured to:

obtain co-occurrence probability information in which a first co-occurrence probability of each word of a plurality of words is stored in association with each of a plurality of distribution destinations, the first co-occurrence probability indicating a probability that each word is included in a message that has been distributed to each of the distribution destinations associated therewith;

upon occurrence of a message to be distributed to one of the plurality of distribution destinations, and with reference to the co-occurrence probability information extract, from words included in the message to be distributed, unknown words that are not included in the plurality of words, and determine whether a first ratio, of a number of the unknown words to a number of the words, is equal to or greater than a predetermined ratio;

when the first ratio is smaller than the predetermined ratio, distribute the message to one distribution destination of the plurality of distribution destinations, the one distribution destination determined based on the co-occurrence probability information; and when the first ratio is equal to or greater than the predetermined ratio, update the co-occurrence probability information by using the unknown words, and distribute the message to the one distribution destination, wherein the updating the co-occurrence probability information includes:

extract first words which are included in all of a first group of messages each including an unknown word of the unknown words;

calculate the first co-occurrence probability of the unknown word for each distribution destination, based on the co-occurrence probability information regarding the plurality of distribution destinations to which a message including a second word, which is included in all of a second group of messages each including the first words and not including the unknown word, is to be distributed; and register the calculated first co-occurrence probability of the unknown word for each distribution destination, in the co-occurrence probability information.

7. A method, comprising:

obtaining co-occurrence probability information in which a first co-occurrence probability of each word of a plurality of words is stored in association with each of a plurality of distribution destinations, the first co-occurrence probability indicating a probability that each word is included in a message that has been distributed to each of the distribution destinations associated therewith;

upon occurrence of a message to be distributed to one of the plurality of distribution destinations, and with reference to the co-occurrence probability information extracting, from words included in the message to be distributed, unknown words that are not included in the plurality of words, and determining whether a first ratio, of a number of the unknown words to a number of the words, is equal to or greater than a predetermined ratio;

when the first ratio is smaller than the predetermined ratio, distributing the message to one distribution destination of the plurality of distribution destinations, the one distribution destination determined based on the co-occurrence probability information; and when the first ratio is equal to or greater than the predetermined ratio, updating the co-occurrence probability information by using the unknown words, and distributing the message to the one distribution destination, wherein the updating the co-occurrence probability information includes:

extracting first words which are included in all of a first group of messages each including an unknown word of the unknown words;

calculating the first co-occurrence probability of the unknown word for each distribution destination, based on the co-occurrence probability information regarding the plurality of distribution destinations to which a message including a second word, which is included in all of a second group of messages each including the first words and not including the unknown word, is to be distributed; and registering the calculated first co-occurrence probability of the unknown word for each distribution destination, in the co-occurrence probability information.

\* \* \* \* \*